(12) United States Patent
Ma et al.

(10) Patent No.: US 8,496,904 B2
(45) Date of Patent: Jul. 30, 2013

(54) SINGLE-WALLED CARBON NANOTUBE CATALYSTS AND METHOD FOR PREPARING SAME

(75) Inventors: Jun Ma, Lexington, MA (US); David Moy, Germantown, MD (US)

(73) Assignee: Hyperion Catalysis International, Inc., Cambridge, MA (US)

( * ) Notice: Subject to any disclaimer, the term of this patent is extended or adjusted under 35 U.S.C. 154(b) by 1664 days.

(21) Appl. No.: 11/602,136

(22) Filed: Nov. 20, 2006

(65) Prior Publication Data
US 2010/0086472 A1   Apr. 8, 2010

Related U.S. Application Data

(63) Continuation-in-part of application No. 11/349,651, filed on Feb. 7, 2006, now abandoned.

(60) Provisional application No. 60/650,726, filed on Feb. 7, 2005.

(51) Int. Cl.
*D01F 9/12* (2006.01)
*C01B 13/14* (2006.01)

(52) U.S. Cl.
USPC ............ 423/447.3; 423/103; 423/592.1; 977/843; 977/750

(58) Field of Classification Search
USPC .............. 423/447, 592, 103, 447.3, 592.1
See application file for complete search history.

(56) References Cited

U.S. PATENT DOCUMENTS

| | | |
|---|---|---|
| 4,663,230 A | 5/1987 | Tennent |
| 5,171,560 A | 12/1992 | Tennent |

(Continued)

FOREIGN PATENT DOCUMENTS

CN   1530321   9/2004

OTHER PUBLICATIONS

Govindaraj et al. "An investigation of carbon nanotubes obtained from the decomposition of methane over reduced Mg1—xMxAl2O4 spinel catalyst", J. Mater. Res., 14(6), 1999, 2567-2576.*

(Continued)

*Primary Examiner* — Emily Le
*Assistant Examiner* — Rebecca Lee
(74) *Attorney, Agent, or Firm* — Laura L. Lee

(57) ABSTRACT

An activated catalyst capable of selectively growing single-walled carbon nanotubes when reacted with carbonaceous gas is provided. The activated catalyst is formed by reducing a catalyst that comprises a complex oxide. The complex oxide may be of formula $A_{x-w}F_wB_{y-v}G_vO_z$ wherein $x/y \leq 2$; $z/y \leq 4$; $0 \leq w \leq 0.3x$; $0 \leq v \leq 0.3y$; A is a Group VIII element; F is an element that is different from A but has, in said composition, the same valence state as A; B is an element different from A and F, and is an element whose simple oxide, in which B is at the same valence state as in the complex oxide, is not reducible in the presence of hydrogen gas at a temperature less than about 900° C.; G is an element different from A, B and F, and is an element whose simple oxide, in which G is at the same valence state as in the complex oxide, is not reducible in the presence of hydrogen gas at a temperature less than about 900° C.; and O is oxygen. The complex oxide is reduced at a temperature less that 950° C. Methods of making, uses for and carbon fibril-containing product made with these activated catalysts are also provided.

22 Claims, 9 Drawing Sheets

U.S. PATENT DOCUMENTS

| | | | |
|---|---|---|---|
| 5,424,054 | A | 6/1995 | Bethune et al. |
| 5,456,897 | A | 10/1995 | Moy et al. |
| 5,569,635 | A | 10/1996 | Moy et al. |
| 6,143,689 | A | 11/2000 | Moy et al. |
| 6,333,016 | B1 | 12/2001 | Resasco et al. |
| 6,761,870 | B1 | 7/2004 | Smalley et al. |
| 7,250,148 | B2* | 7/2007 | Yang et al. .................. 423/447.3 |
| 2004/0067848 | A1* | 4/2004 | Wakatsuki et al. ............ 502/328 |
| 2005/0074392 | A1 | 4/2005 | Yang et al. |
| 2008/0175787 | A1 | 7/2008 | Ma et al. |
| 2010/0113259 | A1 | 5/2010 | Ma et al. |

OTHER PUBLICATIONS

Bacsa et al. "(Mg,Co)O Solid-Solution Precursors for the Large-Scale Synthesis of Carbon Nanotubes by Catalytic Chemical Vapor Deposition" J.Am.Ceram.Soc. (2002) 2666-2269.

Chen et al., "Growth of Carbon Nanotubes by Catalytic Decomposition of Ch4 or CO on a Ni—MgO Catalyst" (1997) 1495-1501.

Coquay et al., "Mossbauer Spectroscopy Study of MgAl2O4- Matrix Nanocomposite Powders Containing Carbon Nanotubes and Iron-Based Nanoparticles" Acta Mater 48 (2000) 3015-3023.

Coquay et al., "Fe/Co Alloys for the Catalytic Chemical Vapor Deposition Synthesis of Single- and Double -Walled Carbon Nanotubes (CNTs). 1. The CNT-Fe/Co—MgO System" J. Phys. Chem. B (2005) 17813-17824.

Coqual et al., "Fe/Co Alloys for the Catalytic Chemical Vapor Deposition Synthesis of Single- and Double -Walled Carbon Nanotubes (CNTs).2. The CNT-Fe/Co—MgAl2O4 System" J. Phys. Chem. B (2005) 17825-17830.

Coquay et al. "Carbon Nanotubes by a CVD Method Part I: Synthesis and Characterization of the (Mg,Fe)O Catalysts" J. Phys. Chem. B (2002) 13186-13198.

Coquay et al. "Carbon Nanotubes by a CVD Method. Part II: Formation of Nanotubes from (mg, Fe) O Catalysts" J. Phys. Chem. B (2002) 13199-13210.

Coquay et al. "From Ceramic-matrix Nanocomposites to the Synthesis of Carbon Nanotubes" Hyperfine Interactions 130 (2000) 275-299.

Coquay et al. " Mossbauer Spectroscopy Involved in the Study of the Catalytic Growth of Carbon Nanotubes" Hyperfine Interactions 139/140 (2002) 289-296.

Flahaut et al., "Gram-scale CCVD synthesis of double-walled carbon nanotubes" Chem. Commun 2003) 1442-1443.

Flahaut et al. "Powders and Extraction of the Nanotubes" J. Mater. Chem. (2000) 249-252.

Flahaut et al. "Synthesis of Single-walled Carbon nanotubes Using Binary (Fe,Co,Ni) Alloy Nanoparticles Prepared in Situ by the reduction of Oxide Solid Solutions" Chemical Physics Letters 300 (1999) 236-242.

Hu et al. "High-Resolution Transmission Electron Microscopy Study of Carbon Deposited on the NiO/MgO Solid Solution Catalysts" Journal of Catalysis 184 (1999) 298-302.

Laurent et al. "Synthesis of Carbon Nanotubes-Fe—Al1.8Fe0.2O3 Powders. Influence of the Characteristics of the Starting Al1.8Fe0.2O3 Oxide Solid Solution" Materials Research Bulletin 35(2000) 661-673.

Laurent et al. "Carbon Nanotubes-Fe—Alumina Nanocomposites. Part II: Microstructure and Mechanical Properties of the Hot-Pressed Composites" (1998).

Li et al. "Catalytic Production of Carbon Nanotubes by decomposition of CH4 Over the Pre-reduced Catalysts LaNiO3, La4Ni3O10, La3Ni2O7 and La2NiO4" (2001).

Liang et al. "Carbon nanotubes prepared from CO on Pre-reduced La2NiO4 perovskite precursor" Materials Research Bulletin 36 (2001) 471-477.

Liang et al. "Carbon nanotube Growth on Ni-particles Prepared in Situ by Reduction of La2NiO4" Carbon 39 (2001) 897-9203.

Liu et al. "Catalytic Growth of Single-walled Carbon Nanotubes with a Narrow Distribution of Diameters over Fe Nanoparticles Prepared in Situ by the Reduction of LaFeO3" Chemical Physics Letters 357 (2002) 297-300.

Liu et al. "A Study on Carbon nanotubes Prepared from Catalytic Decompostion of C2H2 or Ch4 over the Pre-reduced LaCoO3 Perovskite Precursor" (2000).

Lim et al. "Effect of Co-MCM-41 Conversion to Cobalt Silicate for Catalytic Growth of Single Wall Carbon Nanotubes" J. Phys. Chem. B (2004) 20095-20101.

Maruyama et al. "Vapor-grown Carbon Nanofibers Synthesized from a Fe2O3—Al2O3 Composite Catalyst" Journal of the European Ceramic Society 24 (2004) 463-468.

Peigney et al. "Influence of the Composition of a H2—Ch4 Gas Mixture on the Catalytic Synthesis of Carbon Nanotubes-Fe/Fe3C—Al2O3 Nanocomposite Powders" J. Mater, Chem. (1999) 1167-1177.

Peigney et al. "Carbon Nanotubes-Fe—Alumina Nanocomposites. Part I: Influence of the Fe Content on the Synthesis of Powders" (1998).

Rul et al. "Carbon Nanotubes Prepared in Situ in a Cellular Ceramic by the Gelcasting-foam method" Journal of the European Ceramic Society 23 (2003) 1233-1241.

Wang et al. "Formation of Filamentous Carbon During Methane Decomposition over Co—MgO Catalysts" Carbon 40 (2002) 1911-1917.

Xu et al. "Preparation of Mg1—xFexMoO4 Catalyst and its Application to Grow MWNTs with High Efficiency" Diamond& Related Materials 13 (2004) 1807-1811.

Bacsa, R.R. et al., "High specific surface area carbon nanotubes from catalytic chemical vapor deposition process," Chem. Phys. Letters 323: 566-571 (2000).

Baker and Harris, Chemistry and Physics of Carbon, Walker and Thrower ed., vol. 14, 1978, p. 83.

Bethune, D S, et al., "Cobalt-catalysed growth of carbon nanotubes with single-atomic-layer walls," Nature, vol. 363, pp. 605-607 (1993).

Colomer, J. F., et al., "Large-scale Synthesis of Single-Wall Carbon Nanotubes by Catalytic Chemical Vapor Deposition (CCVD) Method," Chemical Physics Letters, 317:83-89 (2000).

Cordier, A., et al., "In situ CCVD Synthesis of Carbon Nanotubes Within a Commercial Ceramic Foam," J. Mater. Chem., 15, pp. 4041-4050 (2005).

Dai, H., et al., "Single-Wall Nanotubes Produced by Metal-Catalyzed Disproportionation of Carbon Monoxide", Chemical Physics Letters 260: 471-475 (1996).

de Heer, Walt A., "Nanotubes and the Pursuit of Applications," MRS Bulletin, Apr. 2004.

Dresselhaus, M.S., et al., "Single Nanotube Raman Spectroscopy," Accounts of Chemical Research, vol. 35, No. 12, pp. 1070-1078 (2002).

Flahaut, E., et al., "CCVD Synthesis and Characterization of Cobalt-Encapsulated Nanoparticles," Chem. Mater., 14:2553-2558 (2002).

Flahaut,E., et al. "CCVD synthesis of carbon nanotubes from (Mg,Co,Mo)O catalysts: influence of the proportions of cobalt and molybdenum, " J. Mater. Chem., 14:646-653 (2004).

Girardon, JS, et al., "Effect of Cobalt Precursor and Pretreatment Conditions on the Structure and Catalytic Performance of Cobalt Silica-supported Fischer-Tropsch Catalysts," Journal of Catalysis, 230:339-352 (2005).

Guo, T., et al., "Catalytic growth of single-walled nanotubes by laser vaporization" Chem. Phys. Lett. vol. 243: Issues 1-2: pp. 49-54 (1995).

Iljima, S. "Helical microtubules of graphitic carbon," Nature 354:56-58 (1991).

Iljima, S. and Ichihashi,T. "Single-shell carbon nanotubes of 1-nm diameter", Nature, vol .363, pp. 603-605 (1993).

Kitiyanan, B., "Controlled production of single-wall carbon nanotubes by catalytic decomposition of CO on bimetallic Co—Mo catalysts," Chemical Physics Letters, 317, pp. 497-503 (2000).

Maruyama, et al., "Low-temperature synthesis of high-purity single walled carbon nanotubes from alcohol," Chemical Physics Letters, 360, pp. 229-234 (2002).

Oberlin, A. & Endo, M., "Filamentous Growth of Carbon Through Benzene Decomposition," J. of Crystal Growth, vol. 32, pp. 335-349 (1976).

Rao, A. M., et al, "Diameter-Selective Raman Scattering from Vibrational Modes in Carbon Nanotubes," Science, vol. 257, pp. 187-191 (1997).

Ren-Yuan, Tang, et al., "An in Situ Combined Temperature-Programmed Reduction-Mössbauer Spectroscopy of Alumina-Supported Iron Catalysts," Journal of Catalysis, 106:440-448 (1987).

Rodriguez, N., "A Review of Catalytically Grown Carbon Nanofibers," J. Mater. Research, vol. 8, pp. 3233-3250 (1993).

Soneda, Y., et al., "High Yield of Multiwalled Carbon Nanotubes from the Decomposition of Acetylene on Co/Mgo Catalyst," AIP Conference Proceedings, 591:199-203 (2001).

Thess, A., et al., "Crystalline Ropes of Metallic Carbon Nanotubes," Science, 273:483-487 (1996).

van Steen, E., et al., "TPR Study in the Preparation of Impregnated Co/SiO2 Catalysts," Journal of Catalysis 162:220-229 (1996).

Weaver, J.H., "Totally Tubular," Science 265, pp. 611-612 (1994).

* cited by examiner

SINGLE-WALLED CARBON NANOTUBE CATALYSTS AND METHOD FOR PREPARING SAME

CROSS REFERENCE INFORMATION

This application is a continuation in part of U.S. Ser. No. 11/349,651, filed Feb. 7, 2006 which claims benefit to and priority of U.S. Provisional Application No. 60/650,726, filed Feb. 7, 2005, which is hereby incorporated by reference in its entirety.

BACKGROUND OF THE INVENTION

1. Field of Invention

The invention relates to materials and methods for commercially preparing single walled carbon nanotubes. More specifically, this invention relates to material comprising complex oxides, which, when further processed, are viable activated catalysts for carbon fibril-containing products. These products exhibit both a Raman spectrum and characteristic transmission electron micrographs known to indicate the presence of single walled carbon nanotubes.

2. Description of the Related Art

This invention lies in the field of carbon nanotubes (also known as fibrils). Carbon nanotubes are vermicular carbon deposits having diameters less than $1.0\mu$, preferably less than $0.5\mu$, and even more preferably less than $0.2\mu$. Carbon nanotubes can be either multi walled (i.e., have more than one graphene layer more or less parallel to the nanotube axis) or single walled (i.e., have only a single graphene layer parallel to the nanotube axis). Other types of carbon nanotubes are also known, such as fishbone fibrils (e.g., wherein the graphene layers are arranged in a herringbone pattern, compared to the tube axis), etc. As produced, carbon nanotubes may be in the form of discrete nanotubes, aggregates of nanotubes (i.e., dense, microscopic particulate structure comprising entangled carbon nanotubes) or a mixture of both.

Carbon nanotubes are distinguishable from commercially available continuous carbon fibers. For instance, diameter of continuous carbon fibers, which is always greater than $1.0\mu$ and typically 5 to $7\mu$, is far larger than that of carbon nanotubes, which is usually less than $1.0\mu$. Carbon nanotubes also have vastly superior strength and conductivity than carbon fibers.

Carbon nanotubes also differ physically and chemically from other forms of carbon such as standard graphite and carbon black. Standard graphite, because of its structure, can undergo oxidation to almost complete saturation. Moreover, carbon black is an amorphous carbon generally in the form of spheroidal particles having a graphene structure, such as carbon layers around a disordered nucleus. On the other hand, carbon nanotubes have one or more layers of ordered graphitic carbon atoms disposed substantially concentrically about the cylindrical axis of the nanotube. These differences, among others, make graphite and carbon black poor predictors of carbon nanotube chemistry.

It has been further accepted that multi walled and single walled carbon nanotubes are also different from each other. For example, multi walled carbon nanotubes have multiple layers of graphite along the nanotube axis while single walled carbon nanotubes only have a single graphitic layer on the nanotube axis.

The methods of producing multi walled carbon nanotubes also differ from the methods used to produce single walled carbon nanotubes. Specifically, different combinations of catalysts, catalyst supports, raw materials and reaction conditions are required to yield multi walled versus single walled carbon nanotubes. Certain combinations will also yield a mixture of multi walled and single walled carbon nanotubes.

As such, two characteristics are often examined in order to determine whether such process will be commercially feasible for the production of a desired carbon nanotube on an industrial scale. The first is catalyst selectivity (e.g., will the catalyst yield primarily single wall carbon nanotubes or primarily multi-walled carbon nanotubes or other forms of carbon products?). Products of poor selectivity catalysts are contaminated with non-nanotube carbon and usually require purification, conventionally accomplished by selective oxidation of the non-nanotube carbon. Not only does this add an additional and costly process step, but it also results in some loss of the desired single walled carbon nanotubes and may further lead to unintended functionalization of the recovered purified single walled carbon nanotube product. Additionally, mixtures of single and multi walled carbon nanotubes can be difficult to separate. Thus, if single walled carbon nanotubes are desired, the co-produced multi walled carbon nanotubes can be an impurity reducing the usefulness of the product. Thus, a selectivity to single walled carbon nanotubes of at least 50% is preferred. A selectivity of at least 80% to single walled carbon nanotubes is more preferred.

The second is catalyst yield (e.g., weight of carbon product generated per weight of catalyst used). Low yields, i.e. less than 1.0 gram of carbon product per gram of catalyst, lead to a need for extensive purification and are thus undesirable. When both purification and catalyst removal are needed, it is desirable that both operations be accomplished in a single step.

It is most advantageous to produce single walled carbon nanotubes in a yield and at a selectivity such that the product can be used without further processing. Commercial processes are often distinguished incidental observations of single walled carbon nanotubes based on a more robust combination of yield and selectivity. Thus, the combination of a selectivity greater than 50% single walled carbon nanotubes and a yield greater than 1.0 gm carbon/gm catalyst is preferred. Even more preferred are selectivities greater than 80% single walled carbon nanotubes combined with yields greater than 2.0 gm carbon/gm catalyst.

Single-wall nanotube catalyst selectivity can be measured through evaluation of Raman spectra signatures of fibril-containing products, which are informative for differentiating single (and perhaps, double)-walled nanotubes from multi-walled tubes. E.g., "Diameter-Selective Raman Scattering from Vibrational Modes in Carbon Nanotubes," Rao, A M et al, *Science*, vol. 257, p. 187 (1997); Dresselhaus, M. S., et al., "Single Nanotube Raman Spectroscopy," *Accounts Of Chemical Research*, vol. 35, no. 12, pp. 1070-1078 (2002), both hereby incorporated by reference. For example, a sample having sufficiently small diameter nanotubes to be single-walled has a Raman spectrum exhibiting: "radial breathing mode" (RBM) peaks between 150 and 300 wave numbers, the area under the RBM peaks at least 0.1% of the area under a characteristic G band peak, and the intensity of the G band peak at least twice that of a characteristic D band peak (G/D of at least 2.0).

The following multi-walled tube (MWNT) process references are hereby incorporated by reference: Baker and Harris, *Chemistry and Physics of Carbon*, Walker and Thrower ed., Vol. 14, 1978, p. 83; Rodriguez, N., *J. Mater. Research*, Vol. 8, p. 3233 (1993); Oberlin, A. and Endo, M., *J. of Crystal Growth*, Vol. 32 (1976), pp. 335-349; U.S. Pat. No. 4,663,230 to Tennent et al.; U.S. Pat. No. 5,171,560 to Tennent et al.; Iijima, Nature 354, 56, 1991; Weaver, Science 265, 1994; de Heer, Walt A., "Nanotubes and the Pursuit of Applications," *MRS Bulletin*, April, 2004, U.S. Pat. No. 5,456,897 to Moy et al, U.S. Pat. No. 6,143,689 to Moy et al, and U.S. Pat. No. 5,569,635 to Moy et al.

Processes for making single-walled carbon nanotubes (SWNT) are also known. E.g., "Single-shell carbon nanotubes of 1-nm diameter", Iijima, S, and Ichihashi, T. *Nature*, vol. 363, p. 603 (1993); "Cobalt-catalysed growth of carbon nanotubes with single-atomic-layer walls," Bethune, D S, Kiang, C H, DeVries, M S, Gorman, G, Savoy, R and Beyers, R *Nature*, vol. 363, p. 605 (1993); U.S. Pat. No. 5,424,054 to Bethune et al.; Guo, T., Nikoleev, P., Thess, A., Colbert, D. T., and Smalley, R. E., *Chem. Phys. Letters* 243: 1-12 (1995); Thess, A., Lee, R., Nikolaev, P., Dai, H., Petit, P., Robert, J., Xu, C., Lee, Y. H., Kim, S. G., Rinzler, A. G., Colbert, D. T., Scuseria, G. E., Tonarek, D., Fischer, J. E., and Smalley, R. E., *Science*, 273: 483-487 (1996); Dai., H., Rinzler, A. G., Nikolaev, P., Thess, A., Colbert, D. T., and Smalley, R. E., *Chem. Phys. Letters* 260: 471-475 (1996); U.S. Pat. No. 6,761,870 (also WO 00/26138) to Smalley et al; "Controlled production of single-wall carbon nanotubes by catalytic decomposition of CO on bimetallic Co—Mo catalysts," *Chemical Physics Letters*, 317 (2000) 497-503; U.S. Pat. No. 6,333,016 to Resasco et al.; "Low-temperature synthesis of high-purity single walled carbon nanotubes from alcohol," Maruyama et al *Chemical Physics Letters*, 360, pp. 229-234 (Jul. 10, 2002). These articles and patent documents are hereby incorporated by reference. Currently known processes for forming single-walled tubes are unable to reach industrially acceptable levels of selectivity and yield under commercially viable reaction conditions.

Recent literature contains disclosures describing the benefits of using catalytic precursors that comprise solid solutions of transition metal oxide(s) and non-reducible (at practical temperatures) oxides. These solid solutions of mixed oxides must be calcined at relatively high temperatures to avoid the presence of non-soluble simple oxide phases. Bacsa, R. R. et al., *Chem. Phys. Letters* 323: 566-571 (2000) and *J. Am. Ceram. Soc.*, 85: 2666-69 (2002), both incorporated by reference, describe catalysts made by the selective reduction (T>800° C.) in $H_2/CH_4$ of "solid solutions between one or more transition metal oxides and a non-reducible oxide such as $Al_2O_3$, $MgAl_2O_4$ or MgO." The solid solutions were made by combustion synthesis, employing combustion of both precursors and a fuel (typically urea). Both transmission electron micrographs and Raman spectra showed the presence of a mixture of single-walled/double walled tubes and a substantial amount of non-tubular amorphous products. Flahaut, et al., *J. Materials Chemistry*, 10: 249-252 (2000) describes the same catalyst synthesis as above except giving combustion synthesis temperature as "usually >800° C.".

Coquay, et al., *J. Phys Chem B*, 106: 13199 (2002) and Coquay, et al. *J. Phys Chem B*, 106: 13186 (2002) both identify that the use of oxide phase $Co_3O_4$ catalyzes a yield of thick nanofibers. This was a shortcoming of previous flame synthesis methods in making single-walled nanotube catalysts. Flame-synthesized $Mg_{1-x}Fe_xO$ solid solutions are found to catalyze formation of single-walled nanotubes, while $A_2BO_4$— like particles tend to yield only thick nanofibers. The electron micrographs of product made from flame-synthesized $Mg_{1-x}Fe_xO$ solid solutions reveal that these catalysts only occasionally yield form SWNTs, rather than selectively, thus yielding a few SWNTS along with a broad spectrum of other carbonaceous products. Coquay et al., *J. Phys Chem B*, 109:17813 (2005) studied mixed solid solutions of Fe, Co and Mg prepared by the same high temperature combustion method and reduced in $H_2/CH_4$ at 1000° C. Again, only trace yields of mixed single walled and multi walled tubes contaminated with substantial amounts of non-tubular amorphous carbon were observed. This paper concluded that "the highest CNT quantity and carbon quality are eventually obtained by reduction of iron free $Mg_{0.9}Co_{0.1}O$ solid solution."

Wang and Ruckenstein, *Carbon*, 40: 1911-1917 (2002) disclosed and characterized a range of Co/Mg/O catalysts with differing stoichiometries and calcining temperatures used in their preparation. They found that the $A_2BO_4$ phase only forms at calcining T<700° C. but yielded no filamentous product. When catalysts were calcined at T=900° C. and reacted with methane at the same temperature, microscopic analysis revealed formation of filamentous carbon, but not single-walled nanotubes.

The references cited above, while employing mixed metals as catalysts, all disclose and specifically conclude that solid solutions (in contrast with complex oxide phase material) are favored to generate either tubular or filamentous carbon products. A solid solution is a solid-state solution of one or more solutes in a solvent. Such a mixture is considered a solution rather than a compound when the crystal structure of the solvent remains unchanged by addition of the solutes, and when the mixture remains in a single homogeneous phase. Some mixtures will readily form solid solutions over a range of concentrations, while other mixtures will not form solid solutions at all. The propensity for any two substances to form a solid solution is a complicated matter involving the chemical, crystallographic, and quantum properties of the substances in question. Generally, solute and solvent should have similar atomic radii (15% or less difference), same crystal structure, similar electronegativities, and similar valence state.

On the other hand, a complex oxide is a general definition of oxides or minerals that have specific crystallographic structures and chemical stoichiometry such as rock salt ($ABO_2$, $A_2BO_3$), spinel ($A_2BO_4$) or perovskite-type ($ABO_3$). It is usually made of at least two metal oxides (A and B), for example, perovskite $CaTiO_3$. Under certain circumstances, complex oxide can be converted into solid solution by high temperature process.

Due to the different crystallographic structure, these two materials can usually be distinguished by using crystallographic characterization technique such as diffraction of electron, neutron or X-ray.

There is a need for a method for producing single walled carbon nanotubes with industrially acceptable levels of activity, selectivity and yield under commercially viable reaction conditions. As discussed above, none of the prior art discloses such a methodology; discovery of an acceptable process remains elusive despite an ongoing worldwide search to develop it.

SUMMARY OF THE INVENTION

An activated catalyst capable of growing single-walled carbon nanotubes when reacted with carbonaceous gas, and a method for making such an activated catalyst, is provided. The activated catalyst is formed by reacting sources of A, B, F and G at a temperature sufficiently low so as to form a complex oxide having a formula $A_{x-w}F_wB_{y-v}G_vO_z$ wherein $x/y \leq 2$; $z/y \leq 4$; $0 \leq w \leq 0.3x$; $0 \leq v \leq 0.3y$; A is a Group VIII element; F is an element that is different from A but has, in said composition, the same valence state as A; B is an element different from A and F, and is an element whose simple oxide, in which B is at the same valence state as in the complex oxide, is not reducible in the presence of hydrogen gas at a temperature less than about 900° C.; G is an element different from A, B and F, and is an element whose simple oxide, in which G is at the same valence state as in the complex oxide, is not reducible in the presence of hydrogen gas at a temperature less than about 900° C.; and O is oxygen; and then activating the complex oxide by reducing said complex oxide at a temperature less than about 950° C.

Element A may comprise iron, nickel or cobalt. Element B is selected from aluminum, lanthanum, magnesium, silicon, titanium, zinc, zirconium, yttrium, and may preferably be magnesium. Element F is selected from iron, cobalt, nickel, copper, aluminum, lanthanum, chromium, manganese, molybdenum, and boron. Element G is selected from aluminum, molybdenum, magnesium, silicon, titanium, zirconium, silicon, calcium, strontium, and barium.

Reduction of the catalyst may occur under flowing hydrogen and the activated catalyst may be passivated as an additional process step. Selective reduction of the complex oxide materials disclosed herein requires that during activation only the A and possibly F elements be reducible under decomposition conditions. Therefore, element B should be limited to those elements capable of forming simple oxides of element B in which valence state for B in the simple oxide is equivalent to the valence state for B in the complex oxide, and which are not reducible in the presence of hydrogen gas at a temperature less than or equal to about 900° C. Further, although selective reduction of the complex oxide is herein defined in terms of the reducibility of element B in hydrogen at a specific temperature, it is to be understood that actual catalytic decomposition may, in other embodiments, occur in an atmosphere composed of a wide variety of carbonaceous gases other than methane or other hydrocarbons.

Those catalytic areas formed via selective reduction may be "fully" reduced to the Group VIII element itself or may be areas quite rich in that element to the exclusion of other materials. The morphology, size and spacing of such regions within an activated catalyst are probably critically important to the resultant selectivity and to the yield of fibril-containing products. Without being limited to a particular theory, it is reasonable to postulate that the morphology, size and spacing of the elemental-rich regions derived from selective reduction will vary, for a given recipe of further processing, on whether the Group VIII element is previously located in specific crystallographic states at specific structure sites or is randomly distributed throughout the catalyst in a "solid solution." Further, because the prior art discusses apparent detrimental effects of the coarsening (size increase) of areas reduced from, for example, simple oxide cobaltosic oxide (formula $Co_3O_4$), the presence of the complex oxide in the catalyst to promote SWNT formation is required.

Not wishing to be bound by a particular theory, it is believed that without an appropriate chemical and, perhaps, physical interaction between the complex oxide catalyst (A-rich) and its support (B-rich), the micro or nanoregions of Group VIII (A-rich) activated catalyst will tend to agglomerate to form bigger regions (sintering) upon heating to a temperature that is equal to or greater than half of its melting temperature (° K.). A strong interaction with the support will tend to stabilize these small catalytic regions even at such temperatures. By forming a complex oxide system, not only is there a strong interaction between A and B, but further, as discussed above, each metal site is separated in an orderly manner which may further improve the resistance to sintering. Thus, a selective (or controlled) reduction will result in the formation of small metal particles from component A, separated and stabilized by the much less reducible metal oxide of B.

A further embodiment discloses a method of making single walled carbon nanotubes from the activated catalyst of the present invention.

In an exemplary embodiment, a method of making single walled carbon nanotubes is provided comprising providing a composition comprising a complex oxide having a formula $A_{x-w}F_wB_{y-v}G_vO_z$, wherein $x/y \leq 2$; $z/y \leq 4$; $0 \leq w \leq 0.3x$; $0 \leq v \leq 0.3y$; A is a Group VIII element; F is an element that is different from A but has, in said composition, the same valence state as A; B is an element different from A and F, and is an element whose simple oxide, in which B is at the same valence state as in the complex oxide, is not reducible in the presence of hydrogen gas at a temperature less than about 900° C.; G is an element different from A, B and F, and is an element whose simple oxide, in which G is at the same valence state as in the complex oxide, is not reducible in the presence of hydrogen gas at a temperature less than about 900° C.; and O is oxygen; reducing said composition to form an activated catalyst; contacting a carbonaceous gas with said activated catalyst under suitable conditions for growing single walled carbon nanotubes, said suitable conditions including pressure greater than about 1 atmosphere and less than about 10 atmospheres and temperature greater than about 400° C. and less than about 950° C.; and growing carbon nanotubes on said activated catalyst, said carbon nanotubes comprising single walled carbon nanotubes.

In another embodiment, a method of making single walled carbon nanotubes is provided which comprises contacting a carbonaceous gas with an activated catalyst in a reaction zone at suitable conditions for growing single walled carbon nanotubes, said suitable conditions including a pressure greater than about 1 atmosphere and less than about 10 atmospheres and temperature greater than about 400° C. and less than about 950° C., said activated catalyst comprising a reduced form of a complex oxide, said complex oxide having a formula $A_{x-w}F_wB_{y-v}G_vO_z$ wherein $x/y \leq 2$; $z/y \leq 4$; $0 \leq w \leq 0.3x$; $0 \leq v \leq 0.3y$; A is a Group VIII element; F is an element that is different from A but has, in said composition, the same valence state as A; B is an element different from A and F, and is an element whose simple oxide, in which B is at the same valence state as in the complex oxide, is not reducible in the presence of hydrogen gas at a temperature less than about 900° C.; G is an element different from A, B and F, and is an element whose simple oxide, in which G is at the same valence state as in the complex oxide, is not reducible in the presence of hydrogen gas at a temperature less than about 900° C.; and O is oxygen; and growing carbon nanotubes on said activated catalyst, said carbon nanotubes comprising single walled carbon nanotubes.

In any of the complex oxide formulas discussed above, other values for w or v such as $0 \leq w \leq 0.2x$; $0 \leq w \leq 0.1x$; $0 \leq v \leq 0.2y$; or $0 \leq v \leq 0.1y$ may also be used.

An additional embodiment provides for an activated catalyst capable of selectively growing a carbon fibril-containing product when reacted with carbonaceous gas. The activated catalyst is formed by reduction of a catalyst that comprises a complex oxide, wherein the product is characterized by a Raman spectrum exhibiting RBM peaks between 150 and 300 wave numbers, having the area under said RBM peaks being at least 0.1% of the area under a characteristic G band peak and having the intensity of the G band peak being at least twice that of a characteristic D band peak. Additional embodiments disclose methods of making, use of, and the product formed by such use. Other improvements which the present invention provides over the prior art will be identified as a result of the following description which sets forth specific embodiments. The description is not in any way intended to limit the scope of the present invention, but rather only to provide examples. The scope of the present invention is pointed out in the appended claims.

DETAILED DESCRIPTION OF PREFERRED EMBODIMENTS

Figure 1:
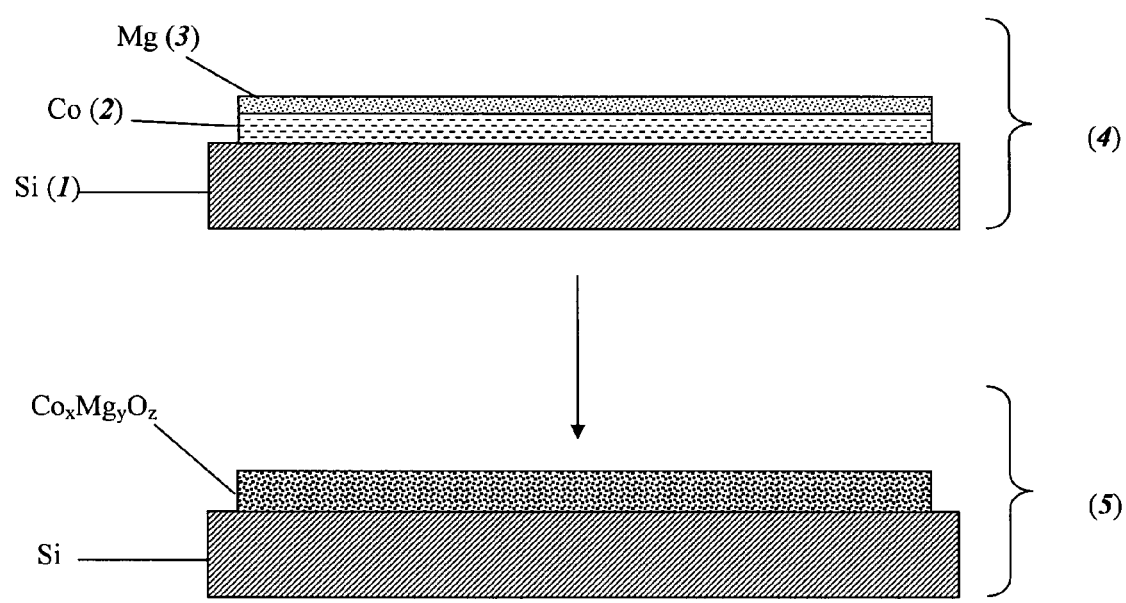
FIG. 1 illustrates calcination of Co and Mg metal film coatings on a silicon wafer. The final composition of the coating is dependent upon the calcining temperature.

As discussed in the Description of the Related Art, catalysts can be used in reactions to form carbon nanotubes. For the purposes of this disclosure, a catalyst is a material or composition which may be further processed to become capable of forming carbon nanotubes by catalytic decomposition of a carbonaceous gas. A carbonaceous gas is defined as a gas consisting of, containing, relating to or yielding carbon. Carbon nanotubes have also been referred to in the art as fibrils, graphitic fibrils, linear fullerenes, and buckytubes.

Prior to (or simultaneously with) exposure of the catalytic material to the carbonaceous gas, the catalyst is "activated" so that nanotube formation will be thermodynamically and kinetically favorable. Catalysts for the formation of carbon nanotubes are typically "activated" by a reduction process which alters or reduces that material's valence state. As such, an "activated" catalyst is a reduced form of a catalyst or a catalyst that has been further processed to alter or reduce its valence state.

Complex Oxide Catalysts

In U.S. Ser. No. 11/349,651, filed Feb. 7, 2006, entitled "Single Walled Carbon Nanotube Catalyst" by Jun Ma and David Moy, hereby incorporated by reference, the inventors discovered, inter alia, that complex oxides having certain formulas are useful for use as catalysts which can be reduced to form activated catalysts for the formation of single walled carbon nanotubes. These complex oxides may, inter alia, have the formula

wherein x/y≦2 and z/y≦4, A being a Group VIII element; B being an element different from A and is an element whose simple oxide, in which B is in the same state as in the complex oxide, is not reducible in the presence of hydrogen at a temperature less than or equal to about 900° C.; and O being oxygen.

In an exemplary embodiment of the present invention, it has been discovered that a new complex oxide or composition having the following formula:

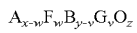

is also useful in the formation of single walled carbon nanotubes. A is a Group VIII element. F is an element different from A but has, in the composition, the same valence state as A. B is an element different from A and F, and is an element whose simple oxide, in which B is in the same valence state as in the complex oxide, is not reducible in the presence of hydrogen at a temperature less than or equal to about 900° C. G is an element different from A, B and F, but like B, is one whose simple oxide, in which G is in the same valence state as in the complex oxide, is not reducible in the presence of hydrogen at a temperature less than or equal to about 900° C., O is oxygen. Here, x/y≦2; z/y≦4; 0≦w≦0.3x; and 0≦v≦0.3 y. With respect to values for w, in preferred embodiments, 0≦w≦0.2x or 0≦w≦0.1x may be used. With respect to values for v, in preferred embodiments, 0≦v≦0.2y or 0≦v≦0.1y may be used.

Thus, in either of the $A_xB_yO_z$, or $A_{x-w}F_wB_{y-v}G_vO_z$ formulas above, elements A may be preferably selected from iron, cobalt and nickel, and F may preferably be selected from iron, nickel, manganese, cobalt, copper, chromium, lanthanum, yttrium, aluminum, molybdenum and boron. Elements B and G may preferably be selected from aluminum, lanthanum, magnesium, silicon, titanium, zinc, zirconium, yttrium, calcium, strontium, barium, and molybdenum.

Methods For Preparing Complex Oxide Catalysts

A number of conventional methods such as spray pyrolysis, sol gel, flame synthesis, super or hypercritical drying, co-precipitation and impregnation may be used to combine sources of A, B, G, and/or F to form the complex oxide catalyst.

The prepared complex oxide catalyst is then reduced using conventional reduction processes and conditions to form the activated catalyst for carbon nanotube formation. For example, the complex oxide may be activated (to form the activated catalyst) by reducing the complex oxide at a temperature less than about 950° C. The complex oxide catalyst may be reduced prior to or simultaneously with the step of forming carbon nanotubes (e.g., in the same reactor and conditions when contacting with carbonaceous gas to grow carbon nanotubes).

In the literature, as well as on the production floor, it is commonly believed that microregions and even nanoregions (clusters of atomic dimensions) of Group VIII elements (typically, iron, cobalt, nickel) provide excellent nucleation sites from which nanotubes will readily grow. These regions may be metallic in nature from the outset or may be formed by the selective reduction of Group VIII-containing compounds (the Group VIII element as a cation), as described below in the embodiments. The compounds disclosed herein are oxides.

Further, the compounds of interest are complex oxides, which are defined herein as oxides of at least two elements (for these purposes, at least one of the elements being of Group VIII) that form a crystallographic lattice within which the Group VIII atoms formulaically reside at specific periodic sites. Complex oxides are distinct from simple oxides which are defined here as compounds comprising a single element and oxygen. While mixtures of simple oxides retain the crystal structures of each of the simple oxides when mixed, the complex oxides often possess different lattice structures and crystal symmetry than those of the simple oxides. Complex oxides are also distinct from solid solutions, the latter defined herein as structures into which the cations are randomly distributed with no long range periodic ordering. In other words, the atoms in a solid solution composition may substitute freely into the various "sites" of the structure. There are several well-known complex oxide crystallographic structures including, for example, spinel and $K_2NiF_4$-type ($A_2BO_4$ or $AB_2O_4$), rock salt ($ABO_2$ or $A_2BO_3$), and Perovskite ($ABO_3$).

Although the remaining discussion centers about the structural class comprising the magnesium cobalt system forming spinel structures, the disclosure, embodiments and appended claims contained herein are not limited to spinel structure complex oxides. In the spinel structure, the oxygens are arranged in a cubic close packed, face-centered structure. There are two types of interstitial sites between the oxygen anions in this structure, named for the crystallographic symmetries which these sites possess. In prototypical magnesium aluminate spinel as defined herein ($Al_2MgO_4$-aluminum being A, magnesium being B in the general spinel group composition $A_2BO_4$), the magnesium ion has a complex valence state of +2 and the aluminum ion has a complex valence state of +3. Within the spinel structure, all of the magnesium ions reside at tetrahedral interstitial sites, while all of the aluminum atoms reside on the distinct octahedral interstitial sites. Simple oxides magnesia, MgO, and alumina, $Al_2O_3$ have very different crystal structures (cubic and hexagonal, respectively) from the aluminate spinel. The simple oxides are defined herein having a magnesium simple oxide valence state of +2 and an aluminum simple oxide valence state of +3. Thus, the magnesium simple oxide valence state is the same as the magnesium complex oxide valence state.

It has been discovered that certain "substitutions" made into an intended complex oxide formula can alter the structural and chemical properties of the intended complex oxide so as to result in a new complex oxide formulation with improved nucleation and stabilization of small metals which emerge from the complex oxide matrix when reduced to form the activated catalyst. The "substitutions" are made by "substituting" certain amounts of one reactant with another prior to forming the complex oxide.

Thus, by way of illustration, to modify an intended complex oxide of the formula $Co_2MgO_4$ (i.e., having an $A_2BO_4$ configuration) with substitutions for A ($Co^{+3}$) and B ($Mg^{+2}$) so as to form a complex oxide of the following formula:

with A, F, B, G, O, x, w, v, y, z as defined earlier, a source of F (i.e., F can be $Fe^{+3}$, $Al^{+3}$, $La^{+3}$, $Mn^{+3}$, $Cr^{+3}$ or $Y^{+3}$) and a source of G (i.e., G can be Ca, Sr, or Zn) is reacted with a source of A and source of B during the preparation of the complex oxide.

In another example, modifications to an intended complex oxide $FeAl_2O_4$ (i.e., $AB_2O_4$ configuration) with substitutions for A ($Fe^{+2}$) and B ($Al^{+3}$) to form a complex oxide of the formula

can be done by reacting a source of F (i.e., F can be $Co^{+2}$, $Ni^{+2}$, $Cu^{+2}$, $Mg^{+2}$ or $Mo^{+2}$) and a source of G (i.e., G can be $La^{+3}$ or $Mo^{+3}$) with the source of A and source B during the preparation of the complex oxide.

Additional complex oxides within the scope of the present invention include, but are not limited to, $Co_{2-w}Fe_wMgO_4$, $Fe_{2-w}Co_wMgO_4$, $Co_{2-w}Al_wMgO_4$, $Co_{2-w}Cr_wMgO_4$, $Co_{1-w}La_wAlO_3$, $Co_{1-w}Cu_wAl_2O_4$, $Co_{2-w}Mo_wMg_{1-v}Sr_vO_4$.

These preceding examples are simply meant to be illustrative and in no way limit the scope of the present invention since one of ordinary skill in the art can now readily determine based on the instant specification which substitutions to use form complex oxides of the present invention.

Furthermore, one skilled in the art will understand that the actual calcining temperature and condition (pressure, etc.) to form complex oxide such as spinel, rock salt, or Perovskite will depend on the chemical interactions between elements A, F, B and G. A lower formation temperature will tend to result from stronger interactions between the elements.

Use Of Reduction Catalysts

Once a complex oxide, whether of $A_xB_yO_z$ or $A_xF_{w-x}B_yG_{v-y}O_z$ configuration, has been prepared, a reduction catalyst can be added to the complex oxide prior to reducing the complex oxide into an activated catalyst. The addition of the reduction catalyst is believed to affect the reduction potential of the complex oxide and therefore lower the temperature required to successfully reduce the complex oxide into an activated catalyst. Thus, the activated catalyst composition is formed from the complex oxide with the aid of the reduction catalyst.

Reduction catalysts may include any of the Group VIII, Group VI and Group I metals or mixtures thereof. Preferred reduction catalyst include Pt and Pd.

It is believed that the mechanism by which a reduction catalyst facilitates reduction may be through the well known spillover effect. While not wishing to be bound by any theory, it is generally believed that, when exposed to a flow of hydrogen, certain transition metals including noble metals can firstly adsorb and then dissociate hydrogen. Atomic hydrogen on the surface of these particles then diffuses to the adjacent support or to other supported species where it may further induce bulk changes. In many cases, the reduction of corresponding oxides via spill-over leads to reduced compounds not otherwise obtainable. The atomic hydrogen can reduce a metal oxide at a temperature well below its reduction temperature determined by TPR under pure hydrogen. For example, Co silicate is very difficult to reduce under hydrogen until 900° C., however, if discrete $Co_3O_4$ particles co-exists in the vicinity of Co silicate, then the reduction of silicate can take place at much lower temperatures. This phenomena is believed to be mediated by spillover hydrogen.

The reduction catalyst may be added to the complex oxide catalyst using conventional methods. For example, the reduction catalyst may deposited on the surface of the complex oxide as discrete particles or at interstitial spaces inside the complex oxide matrix via strong interaction with at least one of the components A, F, B or G. Deposition may be by incipient wetness or by ion exchange. Such ex-situ catalysts can be chosen from metals of VIII, VI, I and combinations thereof. The content of this reduction catalyst may be between 0.1 to 5% by weight of the content of element A.

Alternatively, the reduction catalyst can be created in-situ. In-situ creation of reduction catalyst can result from providing a slightly excessive amount of element A (to that required by the complex oxide) to intentionally leave a small quantity of simple metal oxides on the complex oxide lattice. For example, at 600° C., $Co_2MgO_4$ can be prepared with existence of a small quantity of discrete $Co_3O_4$ particles as identified by XRD technique. The reduction can be monitored by TPR with the appearance of small low temperature reduction signal at around 300° C. and major reduction signal shifted to a lower temperature than the intrinsic level of a pure $Co_2MgO_4$.

Methods For Preparing Single Walled Carbon Nanotubes

Single walled carbon nanotubes may be prepared from the complex oxide catalyst or activated catalyst using conventional methods such as those described and incorporated by reference in the Description Of Related Art section.

For example, single walled carbon nanotubes are grown by contacting a carbonaceous gas with the activated catalyst of the present invention under suitable conditions for growing single walled carbon nanotubes, said suitable conditions including pressure greater than about 1 atmosphere and less than about 10 atmospheres and temperature greater than about 400° C. and less than about 950° C.

In an alternative embodiment, single walled carbon nanotubes are grown by contacting a carbonaceous gas with the complex oxide catalyst of the present invention under conditions which both reduce the complex oxide catalyst to form an activated catalyst and grow single walled carbon nanotubes, said conditions including pressure greater than about 1 atmosphere and less than about 10 atmospheres and temperature greater than about 400° C. and less than about 950° C. In other words, the complex oxide catalyst is not activated prior to the step of contacting with a carbonaceous gas, but instead is activated during the same reactor/step as the step of contacting with the carbonaceous gas.

Additional Complex Oxide Catalysts

The cobalt-magnesium oxide system has been of interest to nanotube manufacturers for some time. This is due to the fact that nanotubes may be relatively easily separated from residual supporting Co—Mg material after the catalytic decomposition is completed. Examples 1 and 2 describe preparations of cobalt-magnesium catalysts and Example 3 reports x-ray diffraction data obtained from Example 1 specimens calcined at various temperatures. The calcining temperature effectively determines what phases will predominate in the prepared catalyst sample. For example, a solid solution begins to form when calcining is performed in air at a temperature above about 800° C., while an inverse spinel of formula $Co_2MgO_4$ is formed at temperatures between 400° C. and 800° C., most dominantly in the samples with Co/Mg ratio of about 2.

The interaction between Co and Si can be influenced greatly by various Co precursors, and preparation procedures, and in some cases, it leads to the formation of complex Co silicate which is much more stable under reducing environment as compared to other Co oxides. For example, in *Journal of Catalysis*, vol. 162, 220-229, 1996, van Steen discovered that during the impregnation step, the precursor of surface cobalt silicate was formed by a reaction between surface silanol groups and aqueous cobalt complexes. A solution of Co acetate with mild pH will favor this interaction and lead to more silicate formation. Moreover, it was found by Girardon and co-workers, *Journal of Catalysis*, vol. 230, 339, 2005, that after impregnation and drying cobalt exists in octahedrally coordinated complexes in catalysts prepared from cobalt nitrate or cobalt acetate. Decomposition of the octahedral complexes results in the appearance of $Co_3O_4$ crystallites and cobalt silicate species. Cobalt repartition between crystalline $Co_3O_4$ and the cobalt silicate phase in the oxidized samples depends on the exothermicity of salt decomposition in air and the temperature of the oxidative pretreatment. $Co_3O_4$ crystallite is the dominant phase in the samples prepared via endothermic decomposition of supported cobalt nitrate. The high exothermicity of cobalt acetate decomposition leads primarily to amorphous, barely reducible complex cobalt silicate. It is also believed that stable Co oxides such as complex Co—Si oxides will stabilize Co under mild or even severe reducing environment, thus prevent sintering of metallic Co and preserve their fine particles suitable for the growth of single-wall carbon nanotubes. For the case of $Co_3O_4$ supported on $SiO_2$, due to lack of strong interaction between Co and Si oxides, $Co_3O_4$ tends to reduce under very mild condition, thus, upon contacting hydrogen and carbon containing gases, reduced Co particles can undergo fast sintering to form bigger particles unsuitable for the growth of single-wall nanotubes.

In addition to Co—Mg and Co—Si or similar system such as Fe—Mg, Fe—Si, Fe—Al system can also undergo a complex oxide formation after a series calcination and reduction, a procedure often encountered in catalytic growth of carbon nanotubes. Tang, et. al, in *Journal of Catalysis*, vol. 106, 440, 1987, has reported the observation of change in the chemical state as well as crystallography of Fe species in a Fe—Al oxide system during calcination and reduction. After deposition onto an alumina support, the Fe species will be in the form of $Fe_2O_3$ on the surface of $Al_2O_3$. Temperature programmed reduction indicated the Fe species can undergo multi-step changes in chemical state before being completely reduced into metallic iron at above 850° C. The initial reduction will reduce $Fe_2O_3$ to $Fe_3O_4$, followed by reduction to Fe(III)—Fe(II) oxides and transition into $FeAl_2O_4$. Thus due to the strong interaction between Fe and Al, especially the formation of a complex oxide, $FeAl_2O_4$, the resultant metallic Fe particles can be very fine and stable even at very high temperatures, e.g. >850° C., a condition usually ripe for nanotube growth when a carbon containing reactant is introduced.

EXAMPLES

The following examples are provided as an illustration of various methods or compositions or complex oxide catalysts, including those that fall within the scope of present invention. These examples are not intended to limit the scope of the present invention.

Example 1

4 grams of magnesia (Martin Marietta MagChem 50) were slurried with deionized water at 80° C. for 3 hours and then allowed to cool. 29 grams of cobalt nitrate $Co(NO_3)_2 \cdot 6H_2O$ (Alpha Chemical) dissolved in deionized water was slowly added to the $Mg(OH)_2/MgO$ slurry while the mixture was constantly stirred. 6N ammonia was used to adjust the slurry pH to be maintained at about 8-9. The resulting slurry was pink and was filtered and washed twice with 1N ammonium acetate by re-slurrying and refiltering. The filter cake was dried at 100° C. for 24 hours and then calcined at various temperatures from 200° C. to 900° C. for 4 hours. The nominal composition of the calcined catalyst is 57 wt % Co and 11.8% Mg (molar ratio of Co/Mg~2). Additional samples were prepared using the same procedure to achieve molar ratio of Co/Mg~1, 0.5, 0.1 and 0.01 respectively.

Example 2

4 grams of magnesia were placed in a flask maintained at 80° C. with constant stirring using a magnetic bar. 29 grams of $Co(NO_3)_2 \cdot 6H_2O$ (Alpha Chemical) were dissolved in 200 mL methanol and slowly added into the flask. After all solution was added, the slurry was kept at 80° C. with constant stirring in order to remove all solvent. The resulting powder was further dried at 110° C. for 24 hours and then calcined at various temperatures from 200° C. to 900° C. for 4 hours. The nominal composition of the calcined catalyst is 57 wt % Co and 11.8% Mg (molar ratio of Co/Mg~2). Additional samples were prepared using the same procedure to achieve molar ratio of Co/Mg~1, 0.5, 0.1 and 0.01 respectively.

Example 3

The phase analysis of samples made in Examples 1 and 2 is carried out using X-ray diffraction technique on a Rigaku 300 X-ray diffractometer equipped with Cu target for X-ray generation and Ni monochromator to remove dispersive X-rays. The samples made from example 1 and calcined under various conditions were pressed into sample holders and XRD spectra are collected. Table 1 summarizes the data obtained. The data correlates well with data previously obtained by Wang and Ruckenstein, *Carbon*, 40: 1911-1917 (2002), a reference cited earlier.

TABLE 1

XRD phase analysis of Co/Mg catalyst prepared at different calcining T

| Calcining T | Crystalline Phase |
|---|---|
| 200° C. | $Co_2O_3$, MgO |
| 400° C. | $Co_3O_4$, $Co_2MgO_4$, MgO |
| 600° C. | $Co_3O_4$ (trace) $Co_2MgO_4$, MgO |
| 800° C. | $Co_2MgO_4$, MgO, (Co, Mg)O solid solution(?) |
| 900° C. | (Co, Mg)O solid solution, MgO |

It is instructive to study Table 1 to understand the relevant phase equilibrium in the Co/Mg/O system. Simple oxides, $Co_2O_3$ (cobalt with a simple oxide valence state of +3) and MgO are stable up to a calcining temperature somewhat exceeding 200° C. While in this discussion all calcining is performed in air, all the embodiments disclosed are not limited to the use of an air atmosphere, as would be clear to one of ordinary skill in the art. Crystallographically, this is analogous to the magnesium aluminate spinel example described above (MgO and $Al_2O_3$ being stable there.) Magnesium oxide remains stable for much higher temperature excursions. Above about 400° C. (the exact temperature appears dependent on the method of processing, e.g. mechanical mixing requiring a higher temperature than impregnation of a nitrate over MgO) cobaltosic oxide (formula $Co_3O_4$) becomes the stable simple oxide. Some of the cobalt cations acquire a simple oxide valence state of +2; leading to an inverse spinel crystallography, in which some of the cobalt ions will fill octahedral sites and some will fill tetrahedral sites. With increasing calcining temperature, more and more MgO will decompose with magnesium anions diffusing into the cobaltosic oxide structure occupying octahedral sites. Because the +2 ions occupy the octahedral sites, this structure is referred to as an inverse spinel. As equilibrium is approached at increasing calcining temperatures, formation of complex $Co_2MgO_4$ proceeds to completion. Once the inverse spinel structure is filled, $Co_2MgO_4$ would have half of the cobalt ions occupying octahedral sites and half in tetrahedral sites. At even higher calcining temperatures >800° C., the complex oxide becomes unstable and formation of a solid solution is favored. Note that some magnesia remains in samples calcined at all of the temperatures in this study.

FIG. 1 illustrates how a Group VIII-containing precursor 2 (in FIG. 1(a)) may be placed upon a silicon (or other suitable material) wafer 1. The Group VIII element, for this embodiment and illustration is cobalt. Atop precursor 2 is placed a second precursor 3 as a source of element B. The assembly 4 is then exposed to temperatures ranging from about 200° C. to about 900° C. to react to make a Co—Mg catalyst 5. Example 4 provides additional detail on a generic way to prepare catalyst in this manner.

Example 4

Cobalt and Mg wire (Purity>99.9999%) was placed in a metal evaporator, and both metal were evaporated sequentially on a tungsten filament, the temperature being controlled by current. A quartz positioner was used to measure and monitor the resulting film thickness. In a common run, 5 nm of Co and 10 nm of Mg were deposited on a Si substrate, where Co/Mg molar ratio is approximately 1/1 (FIG. 1). The coated Si wafers were then placed in an oven and calcined in air at 200° C., 400° C., 600° C. and 800° C. separately.

Examples 5 and 6 are illustrative of a catalytic decomposition procedure performed on samples made in Examples 1 or 2 (Example 5) or in Example 4 (Example 6.) Inert gas is maintained until a reaction temperature of 900° C. is achieved. The carbonaceous gas introduced in these examples was methane; however many other known reactive gases may work as well and use of such gases is well known in this art.

Example 5

A 0.05 gram sample made from example 1 or 2 which has been calcined in air at 400° C. for 1 hour was placed on a frit in a 1-inch vertical quartz reactor under argon flow of 200 mL/min. The temperature was then raised to 900° C. by a Lindberg tube furnace, and inlet gas was switched to methane at 500 mL/min. The reaction was allowed to proceed for 30 minutes before it was turned off. After the reaction, the powder sample was collected and subject to analysis using Laser Raman spectrometer and transmission electron microscope.

Example 6

A 0.5"×0.5" sample cut from example 4 was placed on a frit in a 1-inch quartz reactor under argon flow of 200 mL/min. The temperature was then quickly raised to 900° C., and inlet gas was switched to methane at 500 mL/min. The reaction was allowed to proceed for 30 minutes before turned off.

After the reaction, the wafer sample was subject to analysis using Laser Raman spectrometer.

Figure 2:
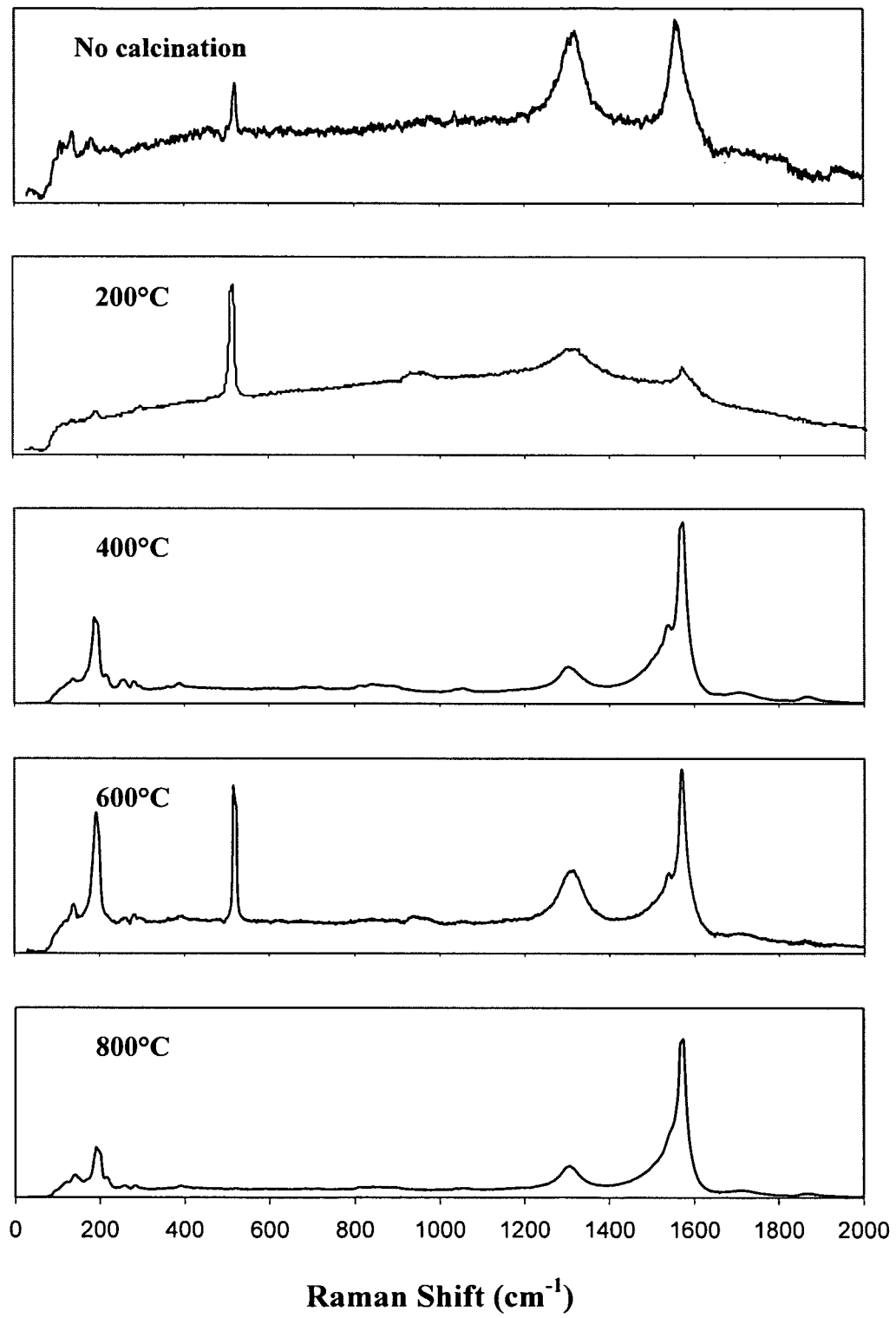
FIG. 2 illustrates Raman spectra of carbon fibril-containing products formed by catalytic decomposition of a carbonaceous gas on Co—Mg mixed oxide catalyst calcined in air at different temperatures. At above 400° C., the presence of single-walled nanotubes is evidenced by the appearance of radial-breathing mode (RBM) peak(s) in the 150-300 cm$^{-1}$ region.

FIG. 2 illustrates Raman spectra of carbon fibril-containing products formed in Examples 5 and 6 and discussion is included below as Example 7.

Example 7

A Raman spectrometer equipped with continuous He—Ne laser with wavelength of 632.8 nm was used to collect Raman excitation. A Raman peak at ~1580 cm$^{-1}$ 10 is present in all types of graphite samples such as highly oriented pyrolytic graphite (HOPG), pyrolytic graphite and charcoal. This peak is commonly referred to as the 'G-band'. The peak at 1355 cm$^{-1}$ 11 occurs when the material contains defects in the graphene planes or from the edges of the graphite crystal. This band is commonly referred to as the 'D-band' and the position of this band has been shown to depend strongly on the laser excitation wavelength. "Radial breathing modes (RBM)" (typically below 300 cm$^{-1}$) were observed with single-walled nanotubes, where all the carbon atoms undergo an equal radial displacement. A small change in laser excitation frequency produces a resonant Raman effect. Therefore, in most cases it is possible to distinguish multi-walled carbon nanotubes (MWNT) from single-walled carbon nanotubes (SWNT) from Raman spectroscopy from the presence or absence of RBM and the split in the G band. Raman spectra of products made on silicon wafer unambiguously indicated the characteristic frequencies of SWNTs when the catalyst was calcined at 400° C. or higher. As is illustrated in Table 2, this is consistence with the presence of complex oxide, $Co_2MgO_4$ (Table 2). The weak D-band demonstrates that the as-synthesized samples contain a very small amount of amorphous carbonaceous materials. In other words, it is likely that high-purity SWNTs were synthesized.

Summarizing, carbon fibril-containing product having sufficiently small diameter nanotubes to be single-walled (or possibly double-walled) has a Raman spectrum exhibiting: "radial breathing mode" (RBM) peaks between 150 and 300 wave numbers, the area under the RBM peaks being at least 0.1% of the area under a characteristic G band peak, the intensity of the G band peak being at least twice that of a characteristic D band peak (G/D of at least 2.0).

The Raman spectrum, described in Example 7 and shown in FIG. 2, reveals 4 to 5 components at 138, 192, 216, 256, and 283 cm$^{-1}$ respectively. The expression: $\omega_{RBM}=(223.75/d)$ cm$^{-1}$, where $\omega_{RBM}$ is radial breathing mode (RBM) frequency in cm$^{-1}$ and d is the diameter of SWNT in nm, can be used to calculate the SWNT diameters. According to this formula, the peaks at 138, 192, 216, 256, and 283 cm$^{-1}$ correspond to the SWNTs with diameter of 1.62, 1.17, 1.04, 0.87 and 0.79 nm respectively. Nanotubes with diameter of 1.17 nm (peak at 192 cm$^{-1}$ 6) appear to dominate based upon relative peak height.

Figure 3:
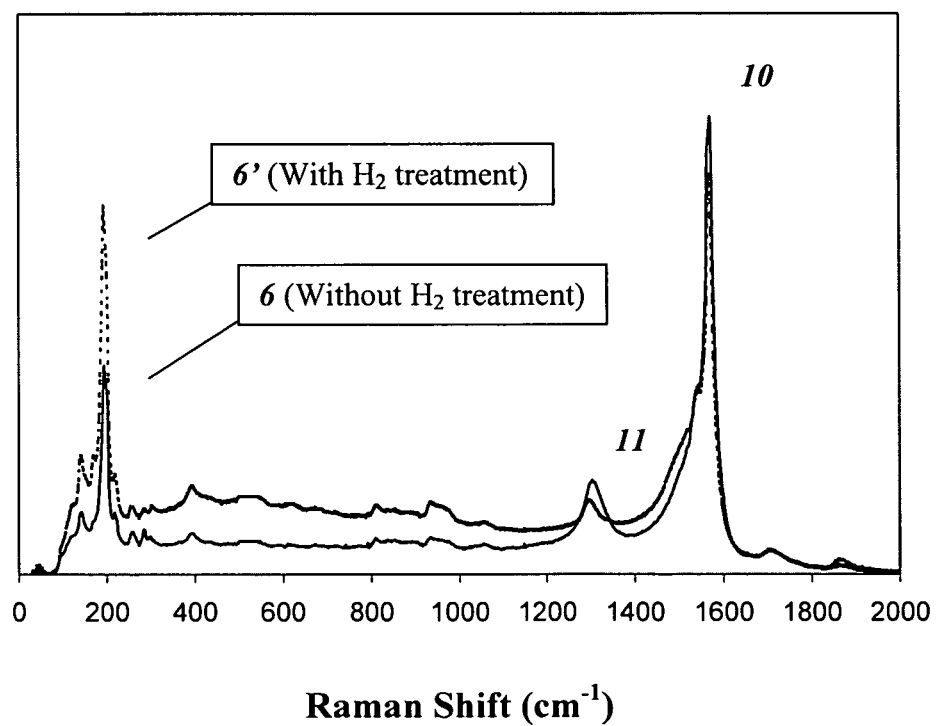
FIG. 3 illustrates Raman spectra of carbon fibril-containing product formed by catalytic decomposition of a carbonaceous gas made on Co—Mg mixed oxide catalysts calcined in air at 800° C. with and without further hydrogen treatment and passivation. Addition of a mild hydrogen treatment proved to enhance the selectivity of single-walled nanotubes as is shown by the greater intensity RBM peak.

FIG. 3 illustrates a Raman spectrum of a carbon fibril-containing product formed in Example 6 plus the additional processing steps of reduction and passivation of the catalyst prior to catalytic decomposition; discussion is included below as Example 8.

Example 8

A sample from Example 4, calcined at 800° C. in air for one hour, was then placed in a 1-inch quartz reactor under hydrogen flow of 100 mL/min and slowly heated up to 250° C. for 30 minutes. The reduced sample was then passivated using 2% $O_2$/Ar. The treated sample was then placed in a reactor following the procedure described in Example 6 to grow single-walled nanotubes.

Peak height 6', when compared with peak height 6, shows significantly enhanced single-wall feature for those grown from this treated sample. Meanwhile, the D-band region was found to become smaller and sharper. This is another indication of substantial improvement of the selectivity of growing single-walled carbon nanotubes.

Examples 9-13 describe embodiments for which Group VIII element A is iron rather than cobalt.

Example 9

Same procedures as described in Example 1 and 2 were applied and $Co(NO_3)_2 \cdot 6H_2O$ was replaced with 40.4 grams of $Fe_2(NO_3)_3 \cdot 9H_2O$.

Example 10

Same procedure as described in Example 4 was applied and Co wire was replaced with iron wire (purity>99.9999%)

Example 11

Same procedure as described in Example 5 was applied to make single-walled nanotubes with catalyst from Example 9.

Example 12

Same procedure as described in Example 6 was applied to make single-walled nanotubes with catalyst from Example 10.

Example 13

Figure 4:
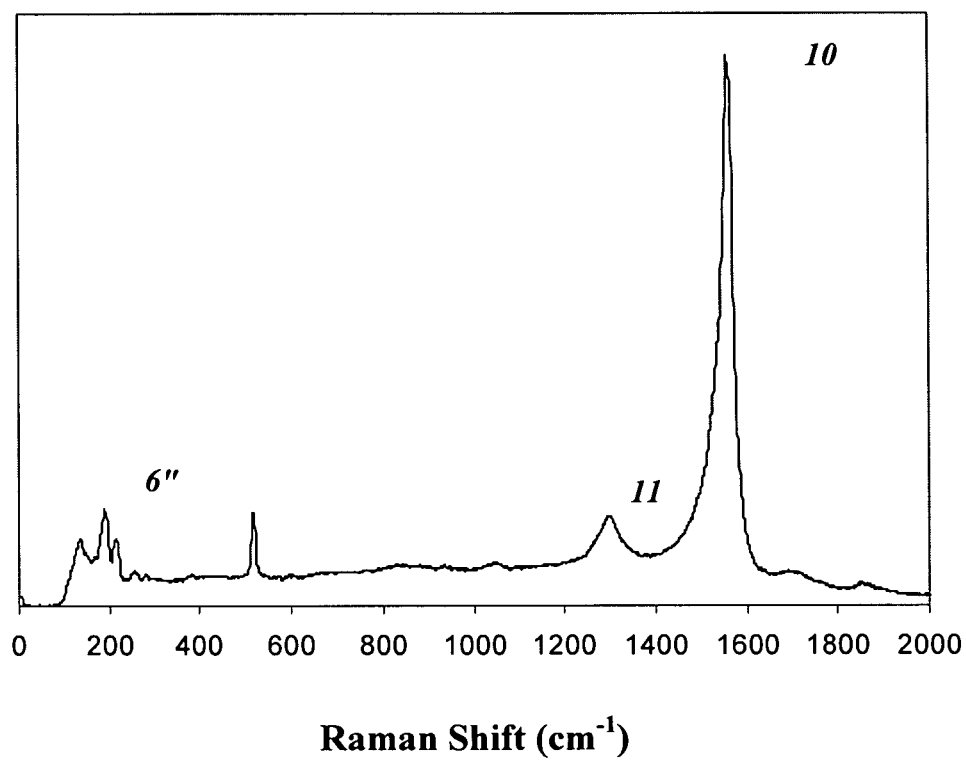
FIG. 4 illustrates Raman spectrum of product made from a Fe—Mg complex oxide catalyst at 900° C. in methane.

In FIG. 4, the Raman spectra of products made from Fe—Mg catalyst system (Example 12) showed similar results to those from the Co—Mg system (Example 6) except that the Raman peak height corresponding to single-walled nanotubes having a diameter of 1.17 nm (peak 6") is less than was previously shown for a Co—Mg activated catalyst in FIG. 2.

TABLE 2

Correlation between complex oxide phases in a catalyst with SWNT growth after activation and decomposition

| Calcination Condition | Crystalline Phase Containing $Co_2MgO_4$ | Crystalline Phase Containing (CoMg)O | Grow Single-walled Nanotubes |
|---|---|---|---|
| 200° C. | No | No | No |
| 400° C. | Yes, trace | No | Yes, low selectivity |
| 600° C. | Yes, some | No | Yes, medium selectivity |
| 800° C. | Yes, majority | Yes, trace | Yes, high selectivity |

Figure 5:
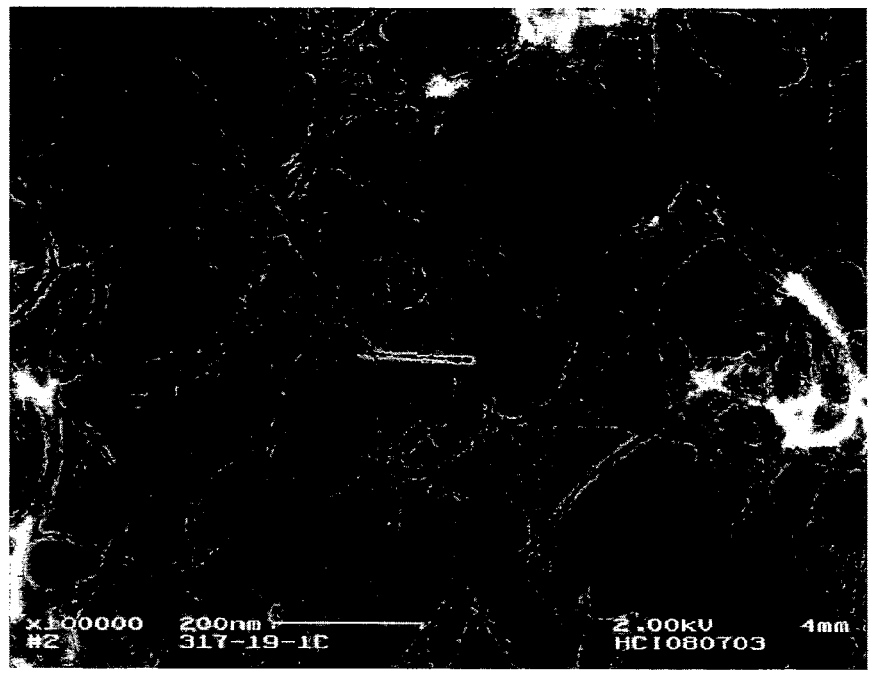
FIG. 5 illustrates scanning electron micrographs of carbon fibril-containing products made using Co—Mg complex oxide catalyst (A) and Fe—Mg complex oxide catalyst (B) at 900° C. in methane. Both catalysts had been calcined in air at 675° C. for one hour.
Figure 5:
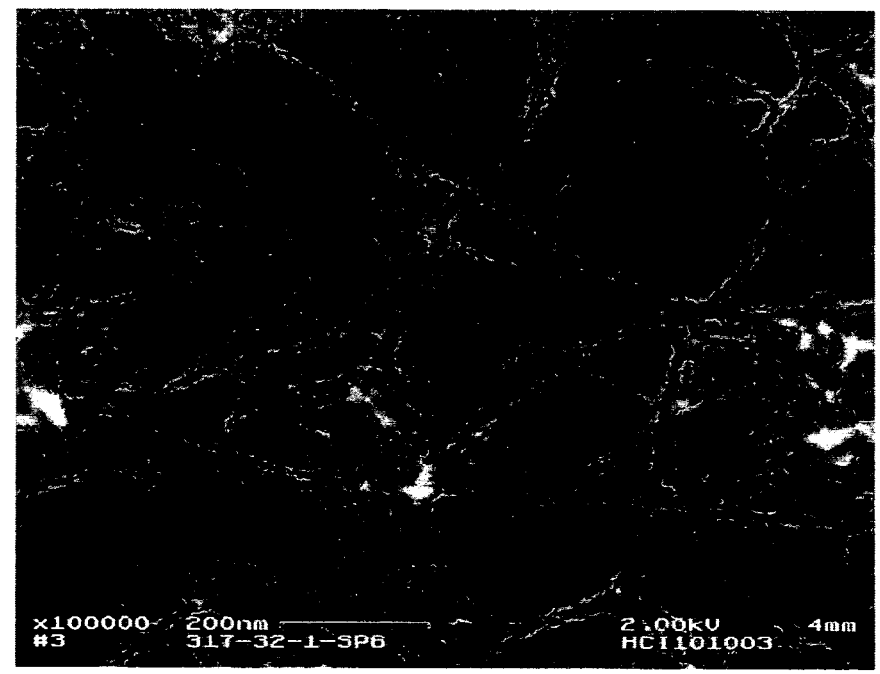

FIG. 5 illustrates scanning electron micrographs of carbon fibril-containing product produced by catalytic decomposition of methane on activated catalysts from the Co—Mg system (FIG. 5A) and the Fe—Mg system (FIG. 5B) and is discussed as Example 14 below.

Example 14

FIGS. 5A and B show low-magnification SEM images of the as-synthesized carbon fibril-containing product produced by catalytic reaction of $CH_4$ over Co—Mg and Fe—Mg complex oxide catalyst at 900° C. They indicate a large amount of tangled carbon filaments with lengths of several tens of microns.

Figure 6:
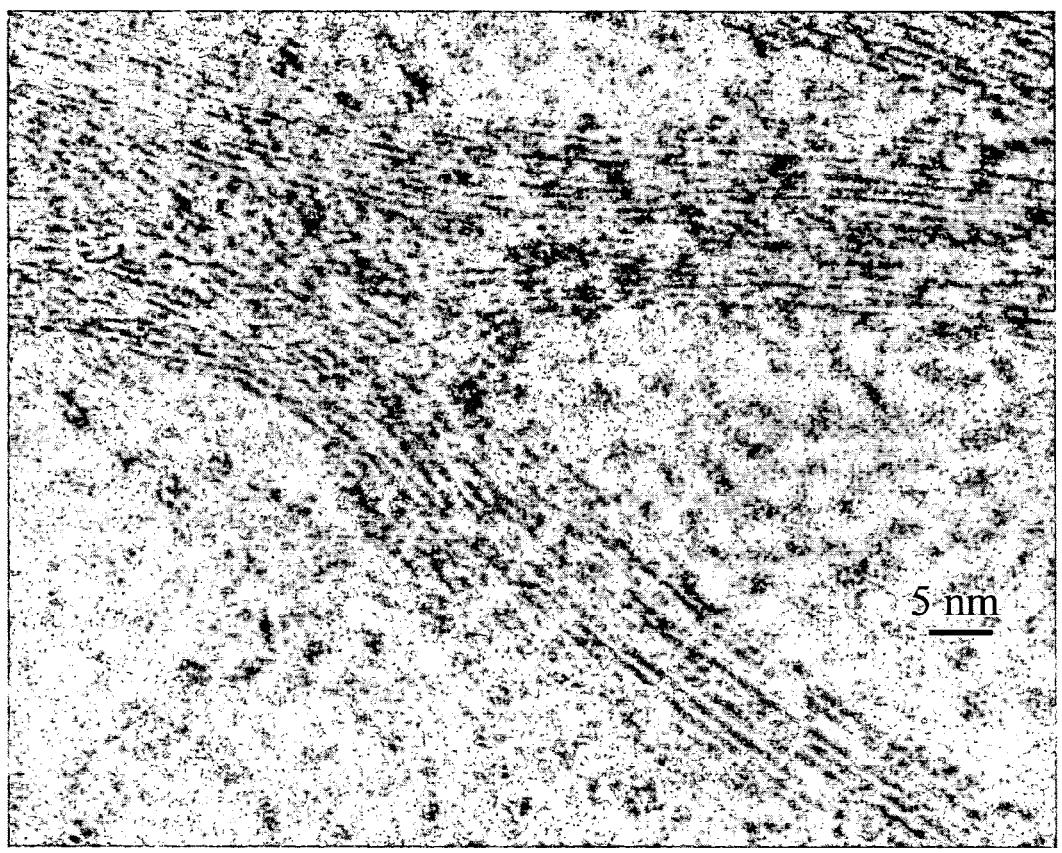
FIG. 6 illustrates a transmission electron micrograph of product made from an activated Co—Mg complex oxide catalyst at 900° C. in methane.

A high resolution transmission electron micrograph (HR-TEM) of SWNTs formed using a catalyst comprising Co—Mg complex oxide phase is shown in FIG. 6 and described in the embodiment of Example 15.

Example 15

FIG. 6 shows a typical HRTEM image of the as synthesized carbon fibril-containing product from Example 5. Examination of such HRTEM images indicates that the produced carbon filaments are mainly SWNT materials consisting of both bundles of SWNTs and small quantities of isolated, discrete SWNTs.

Examples 16 and 17 describe results obtained from samples having lower Co/Mg ratios than that for stoichiometric spinel, namely 0.1 and 1, respectively.

Example 16

0.05 gram of sample made from Example 2 with Co/Mg ratio of 0.1 was placed in a 1-inch vertical quartz reactor. The sample was first calcined in air at 400° C. for 1 hour, and then the temperature of the reactor was rapidly raised to 850° C. under argon flow of 200 mL/min. Once the temperature reaches 850° C., the inlet gas was switched to CO (99.95%) at 300 mL/min and the reaction was allowed to proceed for 15 minutes before being turned off. After the reaction, the product was weighed. Carbon yield was measured to be 0.5. Selectivity of single-walled carbon nanotubes growth was estimated to be better than 70% (as determined from Raman spectrum and HRTEM analysis).

Example 17

0.05 gram of sample made from Example 2 with Co/Mg ratio of 1 was placed in a 1-inch vertical quartz reactor. The sample was first calcined in air at 400° C. for 1 hour, and then the reactor was purged with argon at 200 mL/min and the temperature was decreased down to 250° C. A 5% $H_2$/Ar was then introduced to the reactor at 100 mL/min. After two hours of hydrogen reduction, the inlet gas was then switched back to argon and the temperature was rapidly raised to 850° C. Once the temperature reached 850° C., CO (99.95%) was introduced to the reactor at 300 mL/min and the reaction was allowed to proceed for 15 minutes before being turned off. After the reaction, the product was weighed. Carbon yield was measured to be 1. Selectivity of single-walled carbon nanotubes growth was estimated to be better than 90% (as determined from Raman spectrum and HRTEM analysis.)

Example 18 illustrates the sensitivity of the processing steps involved.

Example 18

A 0.5"×0.5" sample cut from Example 4 is placed on a frit in a 1-inch quartz reactor under argon flow of 200 mL/min. The temperature is then quickly raised to 700° C., and inlet gas is switched to Ethylene/$H_2$/Ar (0.5/2/97.5) at 500 mL/min. The reaction is allowed to proceed for 15 minutes before turned off. After the reaction, both Raman and SEM analysis show that the product consists of a mixture of single-walled and multi-walled carbon nanotubes.

Example 19

Co nitrate and Co acetate was applied as catalyst precursors to form silica-supported Co oxides. Ethanol solution of Co acetate and nitrate with equivalent of 3% metal basis on $SiO_2$ were impregnated on a fumed silica and followed by calcination in air at 400° C. Two distinct products resulted from this process, black powder from nitrate (Sample A) and pink powder from acetate (Sample B). XRD diffractions indicate the black powder contained $Co_3O_4$ while pink powder contains Co silicate, a trioctahedral layered silicate or stevensite.

Example 20

Figure 7:
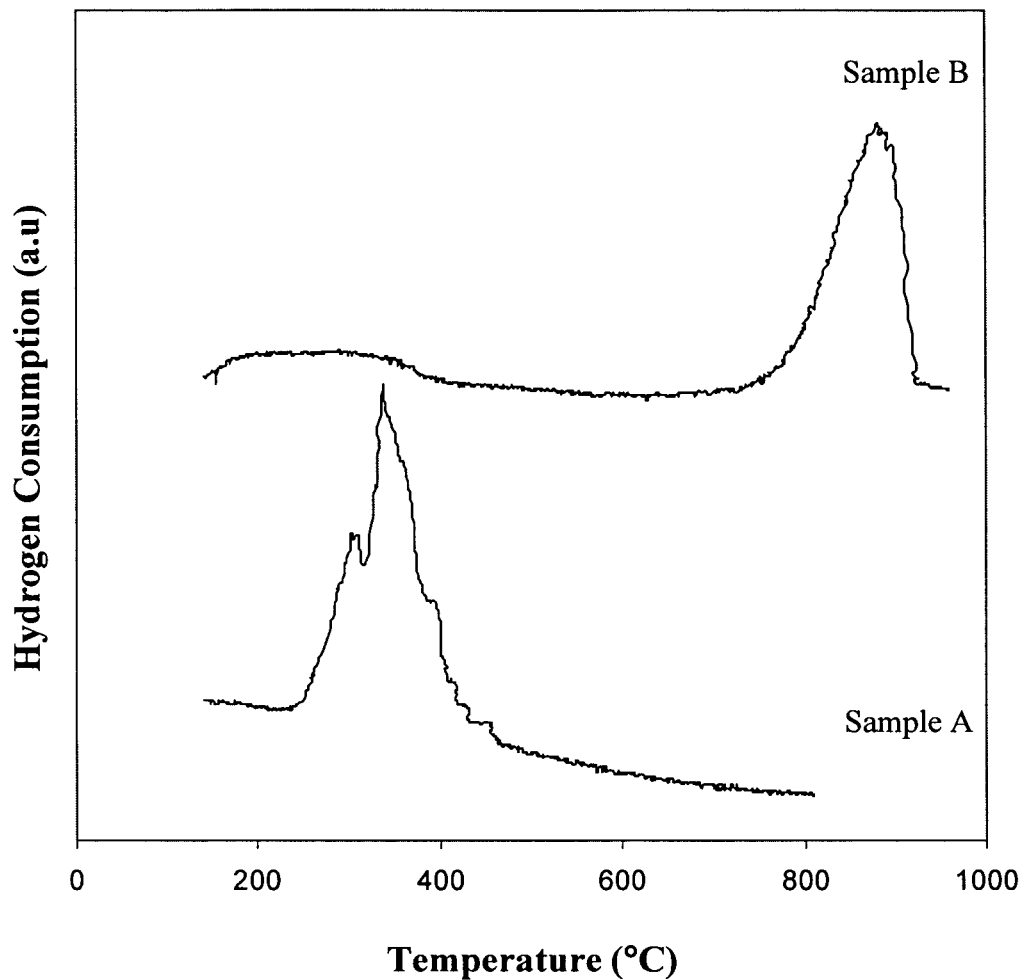
FIG. 7 illustrates spectra of reduction of Co nitrate (Sample A) and Co acetate (Sample B) with 5% $H_2$/Ar as reducing carrier gas

Temperature programmed reduction (TPR) was carried out on a Quanta Chrome Autosorb 1C with 5% $H_2$/Ar as reducing carrier gas. The spectra were shown in FIG. 7. Clearly, different Co precursors have yielded distinct reduction profile. When the nitrate was applied, the resulted Co species was in the $Co_3O_4$ form and can be reduced under mild conditions, while acetate precursor would produce a much stable Co species on the surface of silica, namely, Co silicate, the complete reduction of Co species required a much higher temperature than $Co_3O_4$.

Example 21

Pre-calcined Co/$SiO_2$ catalyst from Example 19 was placed in a 1-inch tube reactor and the temperature were quickly raised to 850° C. under Ar. Immediately after the temperature reached 850° C., the carrier gas was switched to methane and the reaction was allowed to proceed for 30 minutes. Raman analysis was applied to characterize the product from the reaction, and two dramatic different carbon product have resulted from the two catalysts. The product made from methane when catalyzed by $Co_3O_4$/$SiO_2$ appeared to be amorphous in nature, no Raman signature of single-wall nanotubes was found. On the other hand, a clear single-wall feature was presented in the product made from Co silicate catalyst.

Example 22

Al $(NO_3)_3 \cdot 9H_2O$ and Fe $(NO_3)_3 \cdot 9H_2O$ salts with equivalent of 3%, 6% and 9% of Fe on metal basis versus $Al_2O_3$ were dissolved in 25 mL deionized water. Then this nitrate mixture was added concurrently with 20% $(NH_4)_2Co_3$ solution to a round-bottom three neck flask containing 200 ml DI water under strong agitation. The pH of the resultant slurry was kept at ~6 by controlling the addition rate of carbonate. After adding all nitrate solutions, the slurry was stirred for another 15 minutes, followed by filtration and drying at 80° C. After calcined in argon at 500° C., the samples were set aside for reaction tests.

Example 23

Figure 8:
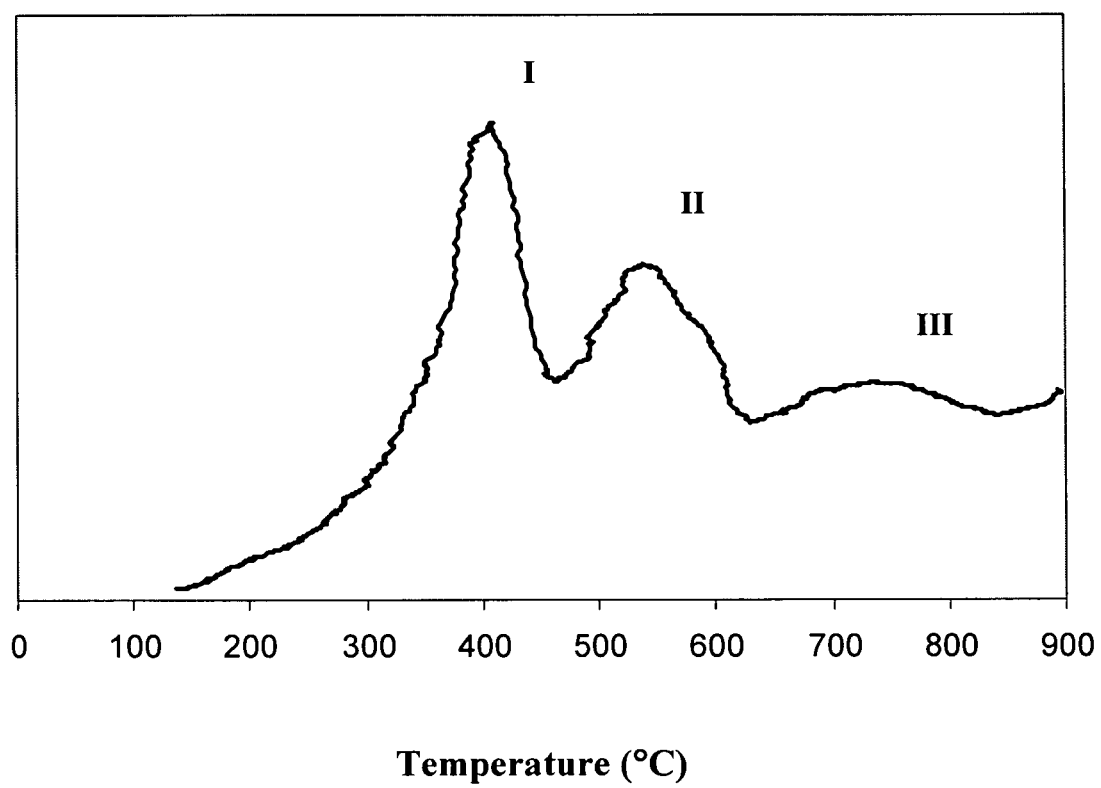
FIG. 8 illustrates the spectrum of reduction of 9% Fe/$Al_2O_3$ with 5% $H_2$/Ar reducing carrier gas. The first reduction (I) at 400° C. indicated the transition from $Fe_2O_3$ to $Fe_3O_4$, followed by $Fe_3O_4$ to $FeAl_2O_4$ at 530° C. (II) and finally to metallic Fe at 740° C. (III).

Reduction of Fe—Al oxide was studied by using temperature programmed reduction with 5% $H_2$/Ar as reducing carrier gas. The spectrum of 9% Fe/$Al_2O_3$ was shown in FIG. 8.

As seen in the spectrum, three major reduction steps were revealed. The first reduction (I) at 400° C. indicated the transition from $Fe_2O_3$ to $Fe_3O_4$, followed by $Fe_3O_4$ to $FeAl_2O_4$ at 530° C. (II) and finally to metallic Fe at 740° C. (III).

Example 24

Figure 9:
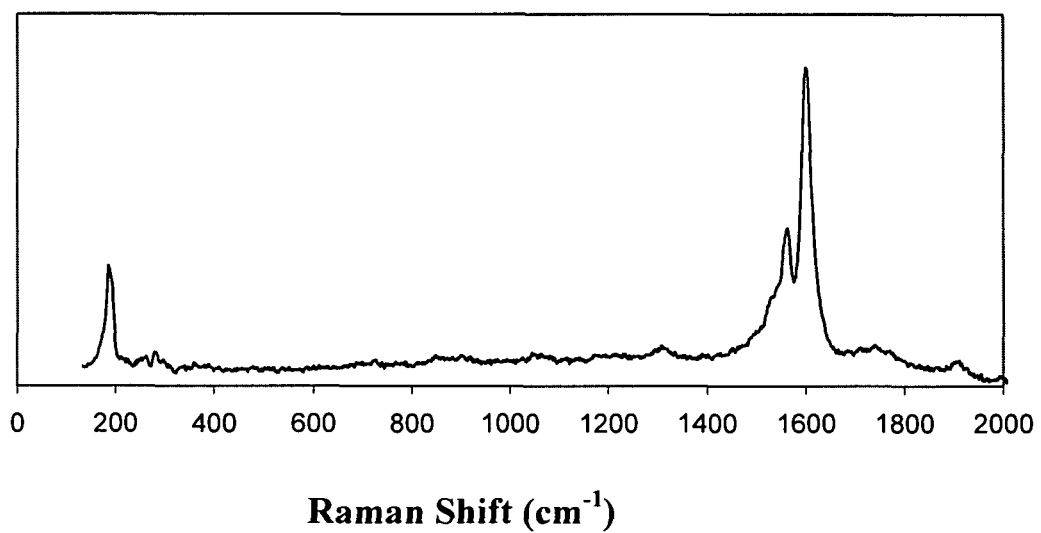
FIG. 9 illustrates Raman spectrum of a high quality single-wall nanotubes-containing product formed by catalytic decomposition of a carbonaceous gas on 9% Fe/$Al_2O_3$ calcined at 800° C. The presence of high quality single wall carbon nanotubes is evidenced by the presence of strong RBM and G-bands with minimum D-band signal.

The calcined 9% $Fe/Al_2O_3$ was place in a 1-inch tube reactor. After completely purged with Ar, the reactor was heated to 500° C. under 5% $H_2$/Ar flow. When the temperature reached 500° C., the carrier gas was then switched back to Ar and the reactor was quickly heated to 800° C. At 800° C., the carrier gas was switched to CO and the reaction was allowed to carry for 30 minutes. The black product was analyzed by Raman spectroscopy. As seen in FIG. 9, the product contains high quality single-wall nanotubes with strong RBM and G-bands and minimum D-band signal.

Example 25

Filmed catalyst of $Fe_{2-w}Al_wMgO_4$ was prepared via physical vapor deposition. Iron, aluminum and magnesium wire (Purity>99.9999%) was placed in a metal evaporator, and the metals were evaporated sequentially on a tungsten filament. The evaporation temperature was controlled by current. A quartz positioner was used to measure and monitor the resulting film thickness. In a common run, 7 nm of Fe and 22 nm of Mg were deposited on a Si substrate, where Fe/Mg molar ratio is approximately 2/3. Al deposition was controlled at a gradually decreasing thickness from one side of wafer to another. Four spots were established at 5 nm (Spot #1), 2 nm (Spot#2), 1 nm (Spot#3) and 0 nm (Spot#4). The coated Si wafers were then placed in an oven and calcined in air at 600° C. for 30 minutes and set aside for reaction tests.

Example 26

A 2"×0.5" sample cut from Example 25 was placed on a frit in a 1-inch quartz reactor under argon flow of 200 mL/min. The temperature was then quickly raised to 900° C., and inlet gas was switched to methane at 500 mL/min. The reaction was allowed to proceed for 30 minutes before turned off. After the reaction, the wafer sample was subject to analysis using Laser Raman Spectroscopy and Scanning Electron Microscopy. Bundles of single-wall carbon nanotubes were found grown at all spots under SEM. The selectivity of single-wall nanotubes was estimated by the ratio of RBM versus G-band as well as G/D ratio. The results suggested that the selectivity of single-wall nanotubes also maintained the same throughout different areas on the wafer indicating that Al substitution didn't cause any detrimental effect. The yield, however, varied among different spots judging by the product thickness and Raman signal intensity of the Si substrate. The yield increased in the order of #1<#4<#2<#3. Thus the optimum catalyst composition appeared to be $Fe_{1.75}Al_{0.25}MgO_4$.

Example 27

Filmed catalyst of $Fe_{2-w}Co_wMgO_4$ and was prepared via physical vapor deposition on a Si wafer. Iron, cobalt and magnesium wire (Purity>99.9999%) was placed in a metal evaporator, and the metals were evaporated sequentially on a tungsten filament. The evaporation temperature was controlled by current. A quartz positioner was used to measure and monitor the resulting film thickness. 5 nm of Fe, 27 nm of Mg and Co layer with decreasing thickness from 5 nm to 0 nm was deposited to make $Fe_{2-w}Co_wMgO_4$ (w=0-1) on a Si substrate. The initial Fe/Mg molar ratio is approximately 1/2.75. In another experiment, 10 nm of Co, 27 nm of Mg and Fe layer with decreasing thickness from 7 nm to 0 nm was deposited to form $Co_{2-w}Fe_wMgO_4$ catalyst. The initial Co/Mg molar ratio is approximately 2/3. Both wafer samples were subject to calcination in air for 30 minutes after deposition and set aside for later use.

Example 28

A 2"×0.5" sample cut from Example 28 from each sample was placed on a frit in a 1-inch quartz reactor under argon flow of 200 mL/min. The temperature was then quickly raised to 900° C., and inlet gas was switched to methane at 500 mL/min. The reaction was allowed to proceed for 30 minutes before turned off. After the reaction, the wafer sample was subject to analysis using Laser Raman spectrometer and Scanning Electron Microscope. For $Fe_{2-w}Co_wMgO_4$, bundles of single-wall carbon nanotubes were found grown at all spots under SEM. The selectivity of single-wall nanotubes, estimated by the ratio of RBM versus G-band as well as G/D ratio, were found to be very similar throughout all spots on the wafer. However, maximum carbon yield appeared to be at the spot with 1 nm deposited Co, which was corresponded to $Fe_{1.65}Co_{0.35}MgO_4$. For $Co_{2-w}Fe_wMgO_4$ catalyst, the selectivity of single-wall carbon nanotubes increased with decreased content of iron, while the carbon yield appeared to maximize at the spot with 1 nm iron deposition. Thus, the optimum composition of "w" appeared to be between 0.01 and 0.17.

Example 29

In a glove box, 200 g of toluene was weighed and placed in a 1-liter beaker with a stirrer bar followed by adding 25 g of magnesium methoxide (6-10%) solution. Under constant agitation, small proportions iron ethoxide weighing 3.844 g was added into the beaker. The gel formation started shortly after addition of 2 mL of water. The stirring was maintained overnight in the glove box. Then another 2 mL of water was again added and the contents stirred thoroughly before taking out the beaker from the glove box. The beaker was emptied in the vessel of an autoclave. A pressure test was performed by keeping the vessel pressurized at 1000 psi using nitrogen. Then the vessel was brought back to atmospheric pressure and again pressurized to 500 psi. The heating of the vessel was next started with the stirring of the contents at 500 rpm. A number of readings of pressure and temperature were recorded at intervals of 10 minutes up to 1.5-2.0 hours until the temperature reached approximately 348° C. The sample was then removed from the vessel and carefully calcined in air by raising the temperature very slowly to about 400-600° C. The collected sample is $Fe_2MgO_4$ as confirmed by XRD. In another experiment, half of the iron content was replaced by Co ethoxide (~1.9 gram), and the sample was prepared following the same procedure to make $FeCoMgO_4$.

Example 30

A precursor gel solution was made on a small scale using cobalt nitrate, magnesium nitrate and aluminum nitrate in a 500-mL round bottom flask on a heating mantle. A dilute solution was made of the three salts by dissolving 1.0 gram cobalt nitrate hexahydate, 12.821 g of magnesium nitrate and 18.75 g of aluminum nitrate in 100 cc of water. A solution of citric acid was also made by dissolving 9.606 g in 100 cc water. Then appropriate quantities of both solutions were mixed with the molar ratio of nitrate ions and citrate ions maintained at 1:1 to bind all metals ions to form a citrate-nitrate complex. The mixed solution was continuously stirred and heated until gel formation took place and started releasing fumes of $NO_2$. The material was then transferred to a crucible and heating was continued to higher temperature in the vicinity of 400-425° C. in an oven. Suddenly the material in the crucible ignited and formed black ash after combustion. The temperature was further raised to 650° C. and maintained for 6-9 h. A fine spinel powder ($Co_{0.14}Al_{1.86}MgO_4$) was collected.

Example 31*

The solution of Co acetate, Mg acetate with Co/Mg ratio of 1/10 is dissolved in 200 mL isopropanol to give a concentration of ~10% on total metal basis and sent to an ultrasonic atomizer, manufactured by Sonaer Inc. The generated aerosol mist with droplet size of approximate 10 micrometer is then passed through a preheated quartz tube reactor at temperature of 600° C. and the outlet gas is passed through a water bath using a bubbler. The precipitates are collected by filtering the collecting water and dry at room temperature under vacuum. The material is confirmed by XRD to be $Co_2MgO_4/MgO$. The surface area of the collected powder is measured at ~100 $m^2/g$ using BET method. Another sample with substituted Cr can also be prepared using the same procedure. The molar ratio of Co/Cr/Mg is set at 1/0.2/10 and the final product is confirmed to be $Co_{1.67}Cr_{0.33}MgO_4$. Both samples are set aside for reaction tests.

Example 32*

$CoLaO_3$ and $Co_{o8}Al_{0.2}LaO_3$ perovskite oxides can also be prepared via the same method described in Example 31. Cobalt acetate and lanthanum acetate are dissolved in ethanol with mole ratio of Co to Al at 1/1. The solution is sent to the atomizer and followed by passing through hot reactor tube for instant reaction to form $CoLaO_3$. In another experiment, aluminum acetate is replaced 20% of Co acetate used in the solution and $Co_{0.8}Al_{0.2}LaO_3$ is obtained through spray pyrolysis.

Example 33

Using the same procedure as described in Example 29, 0.27 g of Strontium isopropoxide (95%, Alfa Chemicals Co) is added to the 1-liter beaker containing 200 g of toluene together with 3.844 g iron ethoxide and 25 g magnesium methoxide (5-10%). After gelation and drying inside the autoclave, the resultant powder is further calcined at 600 C and $Fe_2Mg_{0.9}Sr_{0.1}O_4/MgO$ is obtained.

Example 34

The preparation of SWNTs can be carried out in a conventional tube furnace using a 1-inch quartz reactor tube. Typically 10 mg of catalyst was first placed in a ceramic combustion boat, and the reactor was sealed and purged with argon for 10 minutes. Then the reactor temperature was quickly raised to 750° C. under a minute. Once the temperature became stable, the reactant gas containing CO at 400 mL/min was passed through the reactor and the reaction was allowed to proceed for 30 minutes. The reactor was cooled down to room temperature under argon flow after the reaction and the product sample was collected for further analysis. In another set of reaction condition, the reaction temperature can be set at 800-850° C. and methane was used as reactant at 1 liter/min.

Example 35

SWNT growth in CO using the procedure described in Example 34 was carried out to evaluate the catalyst made in Example 29. The yield of single-wall carbon nanotubes was measured to be 0.2 for $Fe_2MgO_4$ and 0.5 for $FeCoMgO_4$ respectively with selectivity better than 90% according to Raman and TEM studies.

Example 36

SWNT growth was repeated using the same procedure described in Example 34 for the catalyst made in Example 30. The product analysis by Raman showed high percentage of single-wall nanotubes (>90%) and the carbon yield was measured to be 1.0-1.5 by using methane as reactant.

Example 37

SWNT growth is repeated using the same procedure described in Example 34 for the catalyst made in Example 31. Raman analysis indicates the product contains SWNTs with selectivity better than 90% at yield of ~100% on catalyst weight basis for $Co_2MgO_4$ and yield higher than 100% for $Co_{1.67}Cr_{0.33}MgO_4$.

Example 38

SWNT growth is repeated using the same procedure described in Example 34 for the catalyst made in Example 32. The products made from $CoLaO_3$ showed small portion of single-wall nanotubes with majority of multiwall carbon nanotubes. After substitution of Al into the complex oxide, the selectivity to single-wall nanotubes increases significantly to better than 90%.

Example 39

SWNT growth was repeated using the same procedure described in Example 34 for the catalyst made in Example 33. The product analysis by Raman and TEM indicate that the selectivity to single-wall carbon nanotubes is better than 80% and carbon yield is better than 2 by using methane as reactant.

Discussion of Example 29-39

The application of partial substitution into $A_xB_yO_z$ to form $A_{x-w}F_wB_{y-v}G_vO_z$ has demonstrated the promotional effect on both the yield and selectivity of single-wall carbon nanotubes. The effect is likely that by altering the chemical environment of either or both A- and B-site elements, the reducing characteristics of reducible metals, as well as carbon solubility into the metal or alloying metal particles can be modified. Therefore, the nucleation of small metal species into active metal particles suitable for growing single-wall carbon nanotubes are promoted.

Example 40

A Pt-added $Fe_2MgO_4$ filmed catalyst was prepared via physical evaporation deposition method. Platinum, cobalt and magnesium wire (Purity>99.9999%) was placed in a metal evaporator, and the metals were evaporated sequentially on a tungsten filament. The evaporation temperature was controlled by current. A quartz positioner was used to measure and monitor the resulting film thickness. 1 nm of iron, 15 nm of Mg and 0.2 nm of Pt were deposited on a Si wafer. In another experiment, 1 nm of iron and 15 nm of Mg were also prepared to form $Fe_2MgO_4$ without Pt addition. Both samples were subsequently calcined in air at 300° C. for 15 minutes.

Example 41

A 2"×0.5" sample cut from the sample made in Example 40 from each sample was placed on a frit in a 1-inch quartz reactor under argon flow of 200 mL/min. The temperature was then quickly raised to 900° C., and inlet gas was switched to methane at 500 mL/min. The reaction was allowed to proceed for 30 minutes before turned off. After the reaction, the wafer sample was subject to analysis using Laser Raman spectrometer and Scanning Electron Microscope. As compared to $Fe_2MgO_4$, Pt-added sample yielded not only single-wall carbon nanotubes, but also multiwall nanotubes, which likely grew from larger metal particles resulted from excessive reduction and sintering under similar conditions.

Example 42

0.116 g of $Co(NO_3)$.$6H_2O$ and 2.175 g of $Mg(NO_3)_2$.$6H_2O$ were dissolved in 23 mL deionized water in a 100-mL beaker. The molar ratio of Co/Mg was 1/20. 20 g of 0.1% Ammonium hepta-molybdate solution was then added into the mixed solution of $Co(NO_3)_2$ & $Mg(NO_3)_2$ and the solution was kept under constant agitation. Approximately 3 g of 30% $NH_4OH$ was then added to precipitate Co and Mg concurrently. The resultant suspension was finally filtered, washed with acetone and dried at 100° C. in air. Approximate Mo loading of ~2.8% was taken into account at this point. As a comparison, Co—Mg complex oxide of (Co/Mg=1/20) without addition of Mo was also prepared.

Example 43

The preparation of SWNTs was carried out in a conventional tube furnace using a 1-inch quartz reactor tube followed the same method described in Example 34. 10 mg of catalyst made in Example 42 was first placed in a ceramic combustion boat, and the reactor was sealed and purged with argon for 10 minutes. Then the reactor temperature was quickly raised to the target reaction temperature, ca. 600-900° C., and the carrier gas was switched to CO at 300 mL/min. The reaction was allowed to proceed for 30 minutes. With the addition of Mo, SWNTs can be prepared at lower, e.g. 550-700° C., temperatures with similar yield and selectivity as compared to one without Mo.

Example 44

Co nitrate and Co acetate was applied as catalyst precursors to form silica-supported Co oxides. Ethanol solution of Co acetate and nitrate with equivalent of 1.5% and 1.5% metal basis on $SiO_2$ were impregnated on a fumed silica and followed by calcination in air at 400° C. According to Example 19, the Co species presented as two distinct phases, layered Co silicate and discrete $Co_3O_4$ particles. Temperature programmed reduction (TPR) indicated the reduction of Co silicate started at lower temperatures and accelerated with maximum reduction temperature at 850° C., lower than just Co silicate alone (>920° C.). Growth of single-wall nanotubes experiment was conducted as described early in a 1-inch quartz tube reactor, and single-wall nanotube was found to grow at lower temperatures with comparable yield.

Example 45

$CoAl_2O_4$ was prepared by dissolving suitable amount Co nitrate ($Co(NO_3)_2$.$6H_2O$) and aluminum nitrate ($Al(NO_3)_2$.$9H_2O$) in 100 mL ethanol. The molar ratio of Co/Al, defined as (1+x)/2, was controlled as x=−0.1, 0 and 0.1. The solutions were then moved to a rotating evaporator and the solvent is removed and pinkish-colored crystal was obtained. The crystal was then calcined in air at 500° C. and TPR was performed to monitor the reduction profile of the three mixed oxides. When x=−0.1 or 0, where molar ratio of Co/Al is lower than or equal to the stoichiometric value "1/2", a high temperature reduction was observed with maximum reduction rate appears at 870° C. When x=0.1, a Co/Al ratio is higher than the stoichiometric value, excessive Co content formed discrete $Co_3O_4$ particles, which were reduced at much lower temperatures, 350-460° C. The reduced $Co_3O_4$ then catalyzed the reduction of $CoAl_2O_4$ via hydrogen spillover, and can accelerate the reduction and decrease the maximum reduction temperature to about 700° C.

Example 46

A Co—Mg (1/20) oxide catalyst was prepared via method described in Example 1. After calcination at 750° C., the catalyst was characterized by TPR and no reduction signal was observed until 900° C. Pd nitrate was further added into this catalyst via impregnation which would give Pd loading of 1% with regard to the Co—Mg oxide catalyst. The Pd-contained sample was calcined at 300° C. and TPR was carried out to test the reduction profile. The reduction has been greatly affected by the addition of Pd species, the main reduction peak occurred at around 420° C.

The terms and expressions which have been employed are used as terms of description and not of limitations, and there is no intention in the use of such terms or expressions of excluding any equivalents of the features shown and described as portions thereof, it being recognized that various modifications are possible within the scope of the embodiments of the invention, set forth in the following appended claims:

We claim:

1. A method of making single walled carbon nanotubes comprising:

providing a composition comprising a complex oxide having a formula

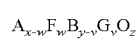

wherein $x/y \leq 2$;

$z/y \leq 4$;

$0 \leq w \leq 0.3x$;

$0 \leq v \leq 0.3y$;

A is a Group VIII element;

F is an element that is different from A but has, in said composition, the same valence state as A;

B is an element different from A and F, and is an element whose simple oxide, in which B is at the same valence state as in the complex oxide, is not reducible in the presence of hydrogen gas at a temperature less than about 900° C.;

G is an element different from A, B and F, and is an element whose simple oxide, in which G is at the same valence state as in the complex oxide, is not reducible in the presence of hydrogen gas at a temperature less than about 900° C.;

O is oxygen;

reducing said composition to form an activated catalyst;

contacting a carbonaceous gas with said activated catalyst under suitable conditions for growing single walled carbon nanotubes, said suitable conditions including pressure greater than about 1 atmosphere and less than about 10 atmospheres and temperature greater than about 400° C. and less than about 950° C.; and growing carbon nanotubes on said activated catalyst, said carbon nanotubes comprising single walled carbon nanotubes.

2. The method of claim 1, wherein said A is iron, nickel or cobalt.

3. The method of claim 1, wherein said B is aluminum, lanthanum, magnesium, silicon, titanium, zinc, zirconium, yttrium, calcium, strontium, molybdenum or barium.

4. The method of claim 1, wherein said carbon nanotubes comprise at least 50% single walled carbon nanotubes.

5. The method of claim 1, wherein said B is magnesium and G is calcium or strontium.

6. The method of claim 5, wherein said A is cobalt and F is iron, aluminum, lanthanum, manganese, chromium, copper or yttrium.

7. The method of claim 1 wherein said A is cobalt, F is molybdenum, B is magnesium and G is calcium or strontium.

8. The method of claim 1, wherein said reducing step and said contacting step occur contemporaneously.

9. A method of making single walled carbon nanotubes comprising:

contacting a carbonaceous gas with an activated catalyst in a reaction zone at suitable conditions for growing single walled carbon nanotubes, said suitable conditions including a pressure greater than about 1 atmosphere and less than about 10 atmospheres and temperature greater than about 400° C. and less than about 950° C., said activated catalyst comprising a reduced form of a complex oxide, said complex oxide having a formula

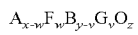

wherein
 $x/y \leq 2$;
 $z/y \leq 4$;
 $0 \leq w \leq 0.3x$;
 $0 \leq v \leq 0.3y$;
 A is a Group VIII element;
 F is an element that is different from A but has, in said composition, the same valence state as A;
 B is an element different from A and F, and is an element whose simple oxide, in which B is at the same valence state as in the complex oxide, is not reducible in the presence of hydrogen gas at a temperature less than about 900° C.;
 G is an element different from A, B and F, and is an element whose simple oxide, in which G is at the same valence state as in the complex oxide, is not reducible in the presence of hydrogen gas at a temperature less than about 900° C.;
 O is oxygen; and growing carbon nanotubes on said activated catalyst, said carbon nanotubes comprising single walled carbon nanotubes.

10. The method of claim 9, wherein said A is iron, nickel or cobalt.

11. The method of claim 9, wherein the B is aluminum, lanthanum, magnesium, silicon, titanium, zinc, zirconium, yttrium, calcium, strontium, molybdenum or barium.

12. The method of claim 9, wherein said carbon nanotubes comprise at least 50% single walled carbon nanotubes.

13. The method of claim 9, wherein said B is magnesium and G is calcium or strontium.

14. The method of claim 13, wherein said A is cobalt and F is iron, aluminum, lanthanum, manganese, chromium, copper or yttrium.

15. The method of claim 9, wherein said A is cobalt, F is molybdenum, B is magnesium and G is calcium or strontium.

16. The method of claim 1, further comprising adding a reduction catalyst to said composition prior to the reducing step,
 wherein said reduction catalyst is a Group VIII, Group VI or Group I metal or its simple metal oxide,
 and wherein said reduction catalyst is not part of said complex oxide.

17. The method of claim 16, wherein said reduction catalyst is Pd or Pt.

18. The method of claim 17, wherein said reduction catalyst is 0.1-5% by weight of element A.

19. The method of claim 1, wherein the catalyst comprises spinel.

20. The method of claim 9, wherein the catalyst comprises spinel.

21. The method of claim 4, wherein said method comprises a yield greater than 1.0 gm carbon/gm catalyst.

22. The method of claim 12, wherein said method comprises a yield greater than 1.0 gm carbon/gm catalyst.

* * * * *